US009196130B2

(12) United States Patent
Saunders

(10) Patent No.: US 9,196,130 B2
(45) Date of Patent: Nov. 24, 2015

(54) GAMING SYSTEM AND METHOD PROVIDING A MATCHING GAME HAVING A PLAYER-ADJUSTABLE VOLATILITY

(71) Applicant: IGT, Las Vegas, NV (US)

(72) Inventor: Brian F. Saunders, Sunnyvale, CA (US)

(73) Assignee: IGT, Las Vegas, NV (US)

( * ) Notice: Subject to any disclaimer, the term of this patent is extended or adjusted under 35 U.S.C. 154(b) by 145 days.

(21) Appl. No.: 14/026,538

(22) Filed: Sep. 13, 2013

(65) Prior Publication Data

US 2015/0080084 A1 Mar. 19, 2015

(51) Int. Cl.
*A63F 13/00* (2014.01)
*G07F 17/34* (2006.01)
*G07F 17/32* (2006.01)

(52) U.S. Cl.
CPC ............ *G07F 17/34* (2013.01); *G07F 17/3262* (2013.01)

(58) Field of Classification Search
None
See application file for complete search history.

(56) References Cited

U.S. PATENT DOCUMENTS 4,033,588 A 7/1977 Watts et al.
4,206,920 A 6/1980 Weatherford et al.
4,611,811 A 9/1986 Haase et al.
4,648,600 A 3/1987 Olliges et al.
4,661,906 A 4/1987 DiFrancesco et al.
4,695,053 A * 9/1987 Vazquez et al. ................. 463/18
4,711,454 A 12/1987 Small
4,747,600 A 5/1988 Richardson et al.
4,775,155 A 10/1988 Lees
4,798,387 A 1/1989 Richardson
4,875,686 A 10/1989 Timms
5,005,840 A 4/1991 Schwartz et al.
5,043,887 A 8/1991 Richardson et al.
5,046,737 A 9/1991 Fienberg
5,072,381 A 12/1991 Richardson et al.
5,116,049 A 5/1992 Sludikoff et al.
5,158,293 A 10/1992 Mullins
5,242,163 A 9/1993 Fulton et al.
5,351,970 A 10/1994 Fioretti et al.
5,380,007 A 1/1995 Travis et al.
5,401,024 A 3/1995 Simunek
5,419,592 A 5/1995 Stuart
5,482,289 A 1/1996 Weingardt et al.
5,586,937 A 12/1996 Menashe
5,628,684 A 5/1997 Bouedec et al.
5,639,089 A 6/1997 Matsumoto et al.
5,647,798 A 7/1997 Falciglia
5,651,735 A 7/1997 Baba
5,679,077 A 10/1997 Pocock et al.
5,687,971 A 11/1997 Khaladkar
5,718,631 A 2/1998 Invencion et al.
5,727,786 A 3/1998 Weingardt et al.
5,743,526 A 4/1998 Inoue (Continued)

*Primary Examiner* — Jason Yen
(74) *Attorney, Agent, or Firm* — Neal, Gerber & Eisenberg LLP

(57) ABSTRACT

Various embodiments of the present disclosure provide a gaming system and method providing a matching game having a player-adjustable volatility. Generally, in various embodiments, the gaming system enables a player to select one of a plurality of different sets of symbols for the gaming system to employ for a play of the matching game. The sets of symbols include different characteristics or features such that the volatility of the matching game differs depending on which particular set of symbols the player selects for the play of the matching game. The gaming system of the present disclosure thus enables the player to tailor the volatility of the matching game to the player's liking by selecting a particular set of symbols.

20 Claims, 17 Drawing Sheets

(56) References Cited

U.S. PATENT DOCUMENTS 5,779,545 A 7/1998 Berg et al.
5,800,269 A 9/1998 Holch et al.
5,823,534 A 10/1998 Banyai et al.
5,871,398 A 2/1999 Schneier et al.
5,909,875 A 6/1999 Weingardt et al.
5,935,002 A 8/1999 Falciglia
5,945,655 A 8/1999 Gilgeous et al.
6,015,346 A 1/2000 Bennett
6,017,032 A 1/2000 Grippo et al.
6,024,640 A 2/2000 Walker et al.
6,033,306 A 3/2000 De Souza et al.
6,062,981 A 5/2000 Luciano
6,079,711 A 6/2000 Wei et al.
6,089,976 A 7/2000 Schneider et al.
6,099,407 A 8/2000 Parker et al.
6,102,400 A 8/2000 Scott et al.
6,146,272 A 11/2000 Walker et al.
6,168,521 B1 1/2001 Luciano et al.
6,174,235 B1 1/2001 Walker et al.
6,183,361 B1 2/2001 Cummings et al.
6,210,276 B1 4/2001 Mullins
6,210,279 B1 4/2001 Dickinson
6,220,961 B1 4/2001 Keane et al.
6,241,606 B1 6/2001 Riendeau et al.
6,250,685 B1 6/2001 Walker et al.
6,257,980 B1 7/2001 Santini, Jr.
6,280,325 B1 8/2001 Fisk
6,283,855 B1 9/2001 Bingham
6,309,298 B1 10/2001 Gerow
6,309,300 B1 10/2001 Glavich
6,315,290 B1 11/2001 Roethel et al.
6,315,291 B1 11/2001 Moody
6,336,862 B1 1/2002 Byrne
6,346,043 B1 2/2002 Colin et al.
6,358,151 B1 3/2002 Enzminger et al.
6,364,313 B1 4/2002 Moody
6,364,767 B1 4/2002 Brossard et al.
6,368,213 B1 4/2002 McNabola
6,368,214 B1 4/2002 Luciano
6,368,218 B2 4/2002 Angell, Jr.
6,398,644 B1 6/2002 Perrie et al.
6,398,645 B1 6/2002 Yoseloff
6,398,646 B1 6/2002 Wei et al.
6,419,583 B1 7/2002 Crumby et al.
6,425,823 B1 7/2002 Byrne
6,454,648 B1 9/2002 Kelly et al.
6,468,156 B1 10/2002 Hughs-Baird et al.
6,478,677 B1 11/2002 Moody
6,514,144 B2 2/2003 Riendeau et al.
6,524,184 B1 2/2003 Lind et al.
6,524,185 B2 2/2003 Lind
6,533,660 B2 3/2003 Seelig et al.
6,533,664 B1 3/2003 Crumby
6,537,150 B1 3/2003 Luciano et al.
6,569,017 B2 5/2003 Enzminger et al.
6,581,935 B1 6/2003 Odom
6,585,590 B2 7/2003 Malone
6,605,001 B1 8/2003 Tarantino
6,609,973 B1 8/2003 Weiss
6,645,071 B2 11/2003 Perrie et al.
6,645,072 B1 11/2003 Kellen
6,656,044 B1 12/2003 Lewis
6,672,960 B1 1/2004 B-Jensen
6,676,516 B2 1/2004 Baerlocher et al.
6,722,655 B1 4/2004 Camero
6,722,981 B2 4/2004 Kaminkow et al.
6,746,329 B1 6/2004 Duhamel et al.
6,755,738 B2 6/2004 Glasson et al.
6,761,632 B2 7/2004 Bansemer et al.
6,764,397 B1 7/2004 Robb
6,780,108 B1 8/2004 Luciano, Jr. et al.
6,802,776 B2 10/2004 Lind et al.
6,802,778 B1 10/2004 Lemay et al.
6,824,465 B2 11/2004 Luciano, Jr.
6,832,956 B1 12/2004 Boyd et al.
6,835,138 B2 12/2004 Baeg
6,840,858 B2 1/2005 Adams
6,908,381 B2 6/2005 Ellis
6,910,962 B2 6/2005 Marks et al.
6,932,700 B2 8/2005 Bennett et al.
6,981,635 B1 1/2006 Hughs-Baird et al.
7,040,984 B2 5/2006 Mead
7,160,186 B2 1/2007 Cuddy et al.
7,160,188 B2 1/2007 Kaminkow et al.
7,182,689 B2 2/2007 Hughs-Baird et al.
7,198,569 B2 4/2007 Wolf et al.
7,235,011 B2 6/2007 Randall et al.
7,252,591 B2 8/2007 Van Asdale
7,258,608 B2 8/2007 Khal
7,303,469 B2 12/2007 Kaminkow
7,306,519 B2 12/2007 Baerlocher
7,314,409 B2 1/2008 Maya et al.
7,399,227 B2 7/2008 Michaelson et al.
7,470,186 B2 12/2008 Cannon
7,553,230 B2 6/2009 Cannon
7,563,164 B2 7/2009 D'Esposito
7,563,167 B2 7/2009 Walker et al.
7,588,496 B2 9/2009 Van Asdale
7,604,539 B2 10/2009 Hartl et al.
7,901,282 B2 3/2011 Cannon
8,002,621 B2 8/2011 Mattice et al.
8,025,561 B2 9/2011 Reddicks et al.
8,070,587 B2 12/2011 Davis et al.
8,075,386 B1 * 12/2011 Leake .............................. 463/18
8,113,939 B2 2/2012 Cannon
8,128,478 B2 3/2012 Meyer
8,357,041 B1 1/2013 Saunders
8,366,538 B1 2/2013 Saunders et al.
8,398,473 B2 3/2013 Baerlocher et al.
8,414,380 B2 4/2013 Saunders et al.
8,430,737 B2 4/2013 Saunders
8,485,901 B2 7/2013 Saunders
8,500,538 B2 8/2013 Warner et al.
2002/0045472 A1 4/2002 Adams
2002/0094857 A1 7/2002 Meyer
2002/0098882 A1 7/2002 Lind et al.
2002/0098883 A1 7/2002 Packes, Jr. et al.
2002/0111207 A1 8/2002 Lind et al.
2002/0111214 A1 8/2002 Lind et al.
2002/0113369 A1 8/2002 Weingardt
2002/0160830 A1 * 10/2002 Stern .............................. 463/20
2003/0013516 A1 1/2003 Walker et al.
2003/0127793 A1 7/2003 Adams
2003/0144050 A1 7/2003 Keaton et al.
2003/0171986 A1 9/2003 Itkis et al.
2003/0178771 A1 9/2003 Banyai
2003/0181234 A1 9/2003 Falciglia, Sr.
2003/0195032 A1 10/2003 Enzminger et al.
2004/0048647 A1 3/2004 Lind et al.
2004/0121833 A1 6/2004 Mezen et al.
2004/0121834 A1 6/2004 Libby et al.
2004/0130096 A1 7/2004 Duhamel
2004/0152499 A1 8/2004 Lind et al.
2004/0176169 A1 9/2004 Lind et al.
2004/0178579 A1 9/2004 Lowell et al.
2004/0204225 A1 10/2004 Campo et al.
2004/0214626 A1 10/2004 Lind et al.
2004/0235555 A1 11/2004 Yarbrough et al.
2004/0242310 A1 12/2004 Perkins
2004/0245722 A1 12/2004 Henderson
2004/0251628 A1 12/2004 Kilby
2004/0266509 A1 12/2004 Bennett et al.
2005/0043092 A1 2/2005 Gauselmann
2005/0059449 A1 3/2005 Yarbrough
2005/0059461 A1 3/2005 Ching et al.
2005/0059467 A1 3/2005 Saffari et al.
2005/0059468 A1 3/2005 Cannon
2005/0059469 A1 3/2005 Gail et al.
2005/0059470 A1 3/2005 Cannon
2005/0059471 A1 3/2005 Cannon
2005/0064932 A1 3/2005 Cannon
2005/0075161 A1 4/2005 McGlone et al.
2005/0096119 A1 5/2005 Lind et al.
2005/0096123 A1 5/2005 Cregan et al.

(56) References Cited

U.S. PATENT DOCUMENTS

| | | | |
|---|---|---|---|
| 2005/0101370 | A1 | 5/2005 | Lind et al. |
| 2005/0101387 | A1 | 5/2005 | Wolf |
| 2005/0119042 | A1 | 6/2005 | Chamberlain et al. |
| 2005/0130730 | A1 | 6/2005 | Lind et al. |
| 2005/0148382 | A1 | 7/2005 | Fox |
| 2005/0164771 | A1 | 7/2005 | Lind et al. |
| 2005/0164772 | A1 | 7/2005 | Lind et al. |
| 2005/0164773 | A1 | 7/2005 | Lind et al. |
| 2005/0167916 | A1 | 8/2005 | Banyai |
| 2005/0187014 | A1 | 8/2005 | Saffari et al. |
| 2005/0192081 | A1 | 9/2005 | Marks et al. |
| 2005/0197180 | A1 | 9/2005 | Kaminkow et al. |
| 2005/0255905 | A1 | 11/2005 | Duke et al. |
| 2005/0255906 | A1 | 11/2005 | Lind et al. |
| 2006/0154716 | A1 | 7/2006 | Bozeman |
| 2006/0189375 | A1 | 8/2006 | Dodge |
| 2006/0246977 | A1 | 11/2006 | Cannon |
| 2007/0021185 | A1 | 1/2007 | Walker et al. |
| 2007/0117611 | A1 | 5/2007 | Dodge |
| 2008/0108420 | A1 | 5/2008 | Groves |
| 2009/0042652 | A1 | 2/2009 | Baerlocher et al. |
| 2009/0088239 | A1 | 4/2009 | Iddings et al. |
| 2009/0197664 | A1 | 8/2009 | Schultz |
| 2009/0247284 | A1 | 10/2009 | Sugiyama et al. |
| 2009/0264179 | A1 | 10/2009 | McKay et al. |
| 2010/0004047 | A1 | 1/2010 | Acres |
| 2010/0016055 | A1 | 1/2010 | Englman |
| 2010/0120506 | A1 | 5/2010 | Davis et al. |
| 2010/0234094 | A1 | 9/2010 | Gagner et al. |
| 2011/0028201 | A1 | 2/2011 | Warner et al. |
| 2011/0045906 | A1 | 2/2011 | Berman et al. |
| 2012/0129588 | A1 | 5/2012 | Cannon |
| 2013/0316782 | A1 | 11/2013 | Daniels |

* cited by examiner 1116,1118

GAMING SYSTEM AND METHOD PROVIDING A MATCHING GAME HAVING A PLAYER-ADJUSTABLE VOLATILITY

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming systems that provide players awards in primary or base games are well known. These gaming systems generally require a player to place a wager to activate a play of the primary game. For many of these gaming systems an award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in larger awards being provided when they do occur.

For such known gaming systems, an amount of a wager placed on a primary game by a player may vary. For instance, a gaming system may enable a player to wager a minimum quantity of credits, such as one credit (e.g., in monetary currency, one penny, nickel, dime, quarter, or dollar in non-monetary currency, one point, credit, coin, token, area play credit, or virtual buck), up to a maximum quantity of credits, such as five credits. The gaming system may enable the player to place this wager a single time or multiple times for a single play of the primary game. For instance, a gaming system configured to operate a slot game may have one or more paylines, and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

One known gaming system enables a player to play a "3 Digit Game." During a play of the 3 Digit Game, the gaming system enables the player to place a wager and to select three of the digits 0 to 9. The order in which the player selects the three digits is a selection order. Thereafter, the gaming system independently generates and displays three of the digits 0 to 9 in a display order. The gaming system then determines whether to provide the player with an award based on: (a) a quantity of the player-selected digits that were also generated and displayed by the gaming system, and (b) a comparison of the selection order and the display order.

Bonus or secondary games are also known in gaming systems. Such gaming systems usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming system may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, speakers, display screens, etc. Part of the enjoyment and excitement of playing certain gaming systems is the initiation or triggering of a bonus game, even before the player knows an amount of a bonus award won via the bonus game.

Various players continually seek out new and different variations to gaming systems. A continuing need thus exists or gaming systems and methods that provide new, exciting, and engaging games.

SUMMARY

Various embodiments of the present disclosure provide a gaming system and method providing a matching game having a player-adjustable volatility. Generally, in various embodiments, the gaming system enables a player to select one of a plurality of different sets of symbols for the gaming system to employ for a play of the matching game. The sets of symbols include different characteristics or features such that the volatility of the matching game differs depending on which particular set of symbols the player selects for the play of the matching game. The gaming system of the present is thus enables the player to tailor the volatility of the matching game to the player's liking by selecting a particular set of symbols.

More specifically, in operation of one embodiment, the gaming system receives, from a player, a selection of one of a plurality of different sets of symbols. Each of the sets of symbols includes a quantity of at least two symbols; at least two of the sets of symbols include different quantities of symbols; and, for each of the sets of symbols, at least two of the symbols in that set of symbols are different. The gaming system also receives, from the player, a selection of a designated quantity of the symbols of the player-selected set of symbols in a target order.

For each of a plurality of symbol display areas, the gaming system randomly selects and displays one of the symbols of the player-selected set of symbols at that symbol display area such that the randomly-selected symbols are displayed in a display order. The gaming system determines whether at least a designated number of the player-selected symbols correspond to different randomly-selected symbols, the designated number being at least one in this embodiment. If at least the designated number of the player-selected symbols correspond to different randomly-selected symbols the gaming system determines an award based on: (i) a quantity of the player-selected symbols that correspond to different randomly-selected symbols, and (ii) a comparison of the target order and the display order.

In this embodiment, if the player-selected set of symbols is a first one of the sets of symbols including a first quantity of symbols, one of the player-selected symbols has a first probability of corresponding to one of the randomly-selected symbols, and if the player-selected set of symbols is a second different one of the sets of symbols including a second different quantity of symbols, that one of the player-selected symbols has a second different probability of corresponding to one of the randomly-selected symbols.

In this embodiment, the player-selected set of symbols and, more particularly, the quantity of symbols included in the player-selected set of symbols, determines the volatility of the play of the matching game. More particularly, the gaming system determines the award or awards available to be provided for the play of the matching game and the probabilities of the gaming system providing those awards for the play of the matching game based on the player-selected set of symbols. As the quantity of symbols included in the player-selected set of symbols increases, the likelihood that the gaming system will provide an award for the play of the matching game decreases, and vice versa. To compensate for this decreased likelihood of the gaming system providing an award and to maintain the same average expected payback percentage for the matching game, in this embodiment the gaming system increases the amount of at least one award available to be provided as the quantity of symbols included in the player-selected set of symbols increases, and vice-versa.

Thus, in this embodiment, if the player-selected set of symbols includes a relatively small quantity of symbols, the gaming system provides a relatively low-volatility play of the matching game in which the gaming system provides relatively small awards relatively frequently. Conversely, if the player-selected set of symbols includes a relatively large quantity of symbols, the gaming system provides a relatively high-volatility play of the matching game in which the gaming system provides relatively large awards relatively infrequently.

It should thus be appreciated that the gaming system and method of the present disclosure provide a new game to increase player engagement, enjoyment, entertainment, and excitement.

Additional features and advantages are described herein, and will be apparent from, the following Detailed Description and the Figures.

DETAILED DESCRIPTION

Matching Game Having a Player-Adjustable Volatility

Various embodiments of the present disclosure provide a gaming system and method providing a matching game having a player-adjustable volatility. Generally, in various embodiments, the gaming system enables a player to select one of a plurality of different sets of symbols for the gaming system to employ for a play of the matching game. The sets of symbols include different characteristics or features such that the volatility of the matching game differs depending on which particular set of symbols the player selects for the play of the matching game. The gaming system of the present disclosure thus enables the player to tailor the volatility of the matching game to the player's liking by selecting a particular set of symbols.

While the matching game is implemented as a primary wagering game in the embodiments described herein, it should be appreciated that the sot game of the present disclosure may additionally or alternatively be implemented as a bonus or secondary game. Further, while any credit balances, any wagers, and any awards are displayed as amounts of monetary currency or credits in this example embodiment, one or more of such credit balances, such wagers, and such awards may be for any suitable non-monetary credits or currency, promotional credits, and/or player tracking points or credits.

Figure 1:
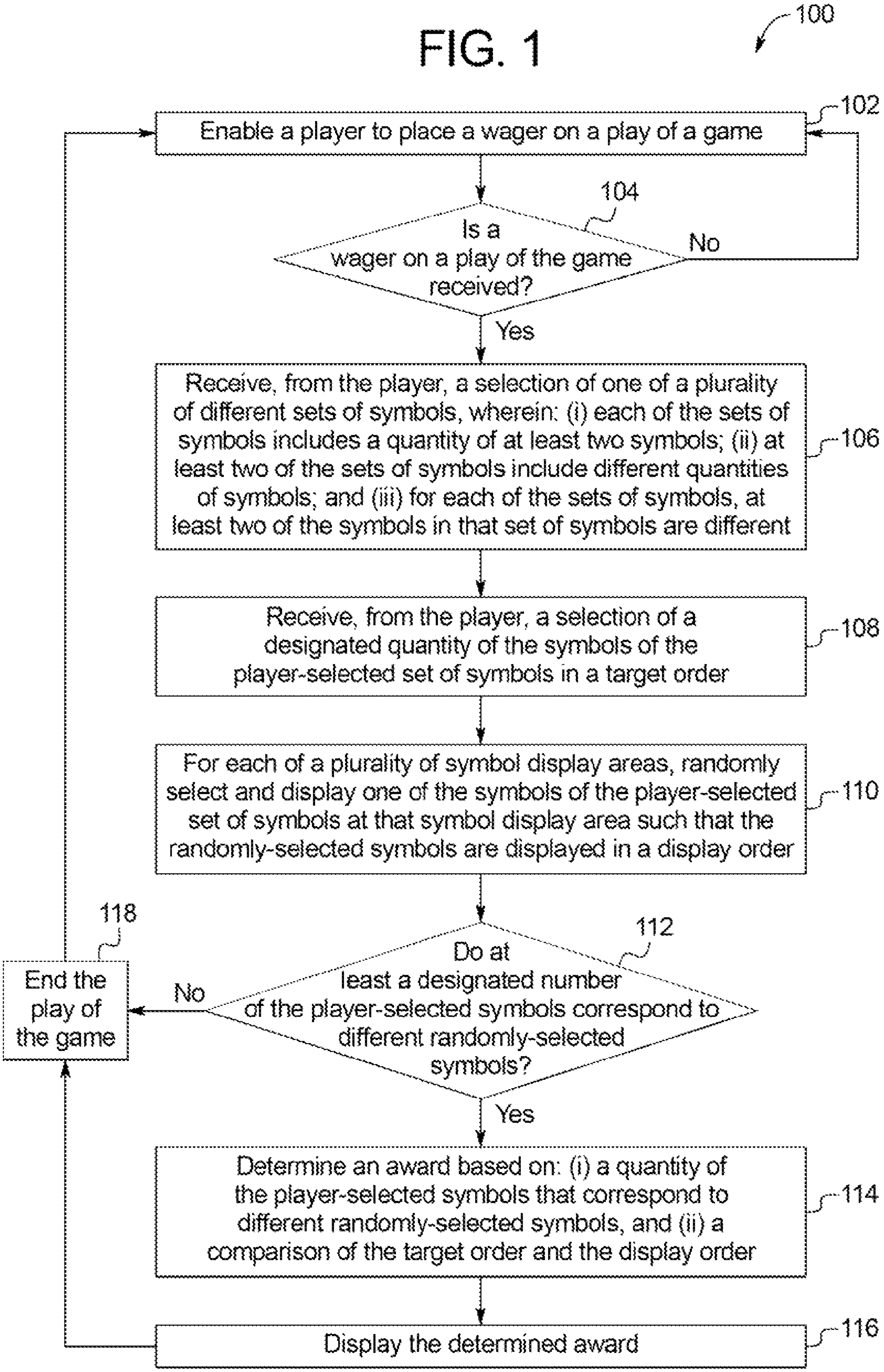
FIG. 1 is a flowchart illustrating an example method of operating one embodiment of the gaming system of the present disclosure.

FIG. 1 illustrates a flowchart of an example process or method 100 of operating one embodiment of the gaming system of the present disclosure. In various embodiments, the process 100 is represented by a set of instructions stored in one or more memories and executed by one or more processors. Although the process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this embodiment, the gaming system enables a player to place a wager on a play of a matching game having an average expected payback percentage, as indicated by block 102. The gaming system determines whether a wager on a play of the matching game was received, as indicated by diamond 104. If the gaming system determines that a wager on a play of the matching game was not received, the process 100 returns to block 102. If, on the other hand, the gaming system determines that a wager on a play of the matching game was received, the gaming system receives, from the player, a selection of one of a plurality of different sets of symbols, wherein: (i) each of the sets of symbols includes a quantity of at least two symbols; (ii) at least two of the sets of symbols include different quantities of symbols; and (iii) for each of the sets of symbols, at least two of the symbols in that set of symbols are different, as indicated by block 106.

In this example embodiment, the player-selected set of symbols and, more particularly, the quantity of symbols included in the player-selected set of symbols, determines the volatility of the play of the matching game. More specifically, in this example embodiment, the gaming system determines the award or awards available to be provided for the play of the matching game and the probabilities of the gaming system providing those awards for the play of the matching game based on the player-selected set of symbols. As further explained below, as the quantity of symbols included in the player-selected set of symbols increases, the likelihood that the gaming system will provide an award for the play of the matching game decreases, and vice-versa. To compensate for this decreased likelihood of the gaming system providing an award and to maintain the same average expected payback percentage for the matching game, the gaming system increases the amount of at feast one award available to be provided as the quantity of symbols included in the player-selected set of symbols increases, and vice-versa. Thus, in this example embodiment, if the player-selected set of symbols includes a relatively small quantity of symbols, the gaming system provides a relatively tow-volatility play of the matching game in which the gaming system provides relatively small awards relatively frequently. Conversely, if the player-selected set of symbols includes a relatively large quantity of symbols, the gaming system provides a relatively high-volatility play of the matching game in which the gaming system provides relatively large awards relatively infrequently.

The gaming system also receives, from the player, a selection of a designated quantity of the symbols of the player-selected set of symbols in a target order, as indicated by block 108. For each of a plurality of symbol display areas, the gaming system randomly selects and displays one of the symbols of the player-selected set of symbols at that symbol display area such that the randomly-selected symbols are displayed in a display order, as indicated by block 110. The gaming system determines if at least a designated number of the player-selected symbols correspond to different randomly-selected symbols, as indicated by diamond 112. In this example embodiment, the designated number is at least one. If the gaming system determines that at least the designated number of the player-selected symbols do not correspond to different randomly-selected symbols, the gaming system ends the play of the matching game, as indicated by block 118, and the process 100 returns to block 102.

If, on the other hand, the gaming system determines that at least the designated number of the player-selected symbols correspond to different randomly-selected symbols, the gaming system determines an award based on: (i) a quantity of the player-selected symbols that correspond to different randomly-selected symbols, and (ii) a comparison of the target order and the display order, as indicated by block 114. The gaming system displays the determined award, as indicated by block 116, and ends the play of the matching game, as indicated by block 118. The process 100 returns to block 102.

FIGS. 2A, 2B, 2C, 2D, 2E, 2F, 2G, 2H, 2I, 2J, and 2K illustrate screen shots of one example embodiment of the gaming system of the present disclosure providing a plurality of plays of one example embodiment of the matching game having a player-adjustable volatility for a player. Generally, for a play of the matching game in this example embodiment, the gaming system enables the player to select one of a plurality of different sets of symbols, which are sets of digits in this example embodiment, for the gaming system to employ for the play of the matching game, wherein each set of digits includes a different quantity of digits. The gaming system receives, from the player, a selection of one of the sets of digits and a selection of designated quantity of the digits of the player-selected set of digits in a target order. In this example, the designated quantity is three (though it should be appreciated that the designated quantity may be any suitable quantity). The gaming system randomly selects the designated quantity of three of the digits of the player-selected set of digits in a display order. The gaming system determines whether at least a designated number of the player-selected digits correspond to different randomly-selected digits. In this example embodiment, the number quantity is one (though it should be appreciated that the designated number may be any suitable number) and a player-selected digit corresponds to a randomly-selected digit if that player-selected digit matches that randomly-selected digit. Here, if at least one of the player-selected digits matches one of the randomly-selected digits, the gaming system determines an award for the play of the matching game based on a quantity of player-selected digits that match different randomly-selected digits and a comparison of the target order and the display order.

In this example embodiment, the gaming system: (a) enables the player to select the designated quantity of three of the digits of the player-selected set of digits with replacement, and (b) randomly selects the designated quantity of three of the digits of the player-selected set of digits with replacement. Put differently, for each of the player's selections of one of the digits from the player-selected set of digits, the gaming system enables the player to select that digit from the entire set of digits, regardless of any other digits the player has previously selected. Similarly, for each random selection of one of the digits from the player-selected set of digits by the gaming system, the gaming system randomly selects that digit from the entire set of digits, regardless of any other digits the gaming system has previously randomly selected. Thus, in certain instances, at least one of: (a) the plurality of player-selected digits, and (b) the plurality of randomly-selected digits may include multiple instances of the same digit.

Additionally, in this example embodiment, each of the sets of digits is associated with and represented by a different set of dice. Each set of dice includes three dice. Each die of a particular set of dice: (a) includes a number of sides equal to the quantity of digits in the set of digits associated with that set of dice, and (b) displays a different one of the digits of the set of digits associated with that set of dice on each side. For instance, each die in the set of dice associated with the set of five digits including the digits 1, 2, 3, 4, and 5: (a) includes five sides; and (b) displays a different one of the digits 1, 2, 3, 4, and 5 on each of the five sides. It should be appreciated that any suitable representation of the sets of symbols may be employed, such as (but not limited to) symbols (without dice), playing cards, dominos, "lottery" balls, Mahjong tiles, reels, wheals, or a coin (having two sides each displaying a different symbol).

In this example embodiment, the player-selected set of digits and, more particularly, the quantity of digits included in the player-selected set of digits, determines the volatility of the play of the matching game. More specifically, in this example embodiment, the gaming system determines the awards available to be provided for the play of the matching game and the probabilities of the gaming system providing those awards for the play of the matching game based on the player-selected set of digits. As the quantity of digits included in the player-selected set of digits increases, the probability that a player-selected digit will match a randomly-selected digit decreases, and vice-versa. Accordingly, as the quantity of digits included in the player-selected set of digits increases, the likelihood that the gaming system will provide an award for the play of the matching game based on matching player-selected digits and randomly-selected digits decreases, and vice-versa.

To compensate for the decreased likelihood of the gaming system providing an award and to maintain the same average expected payback percentage for the matching game, in this example embodiment the gaming system increases the amount of at least one award available to be provided as the quantity of digits included in the player-selected set of digits increases, and vice-versa. Thus, in this example embodiment, if the player-selected set of digits includes a relatively small quantity of digits, the gaming system provides a relatively low-volatility play of the matching game in which the gaming system provides relatively small awards relatively frequently. Conversely, if the player-selected set of digits includes a relatively large quantity of digits, the gaming system provides a relatively high-volatility play of the matching game in which the gaming system provides relatively large awards relatively infrequently.

Figure 2A:
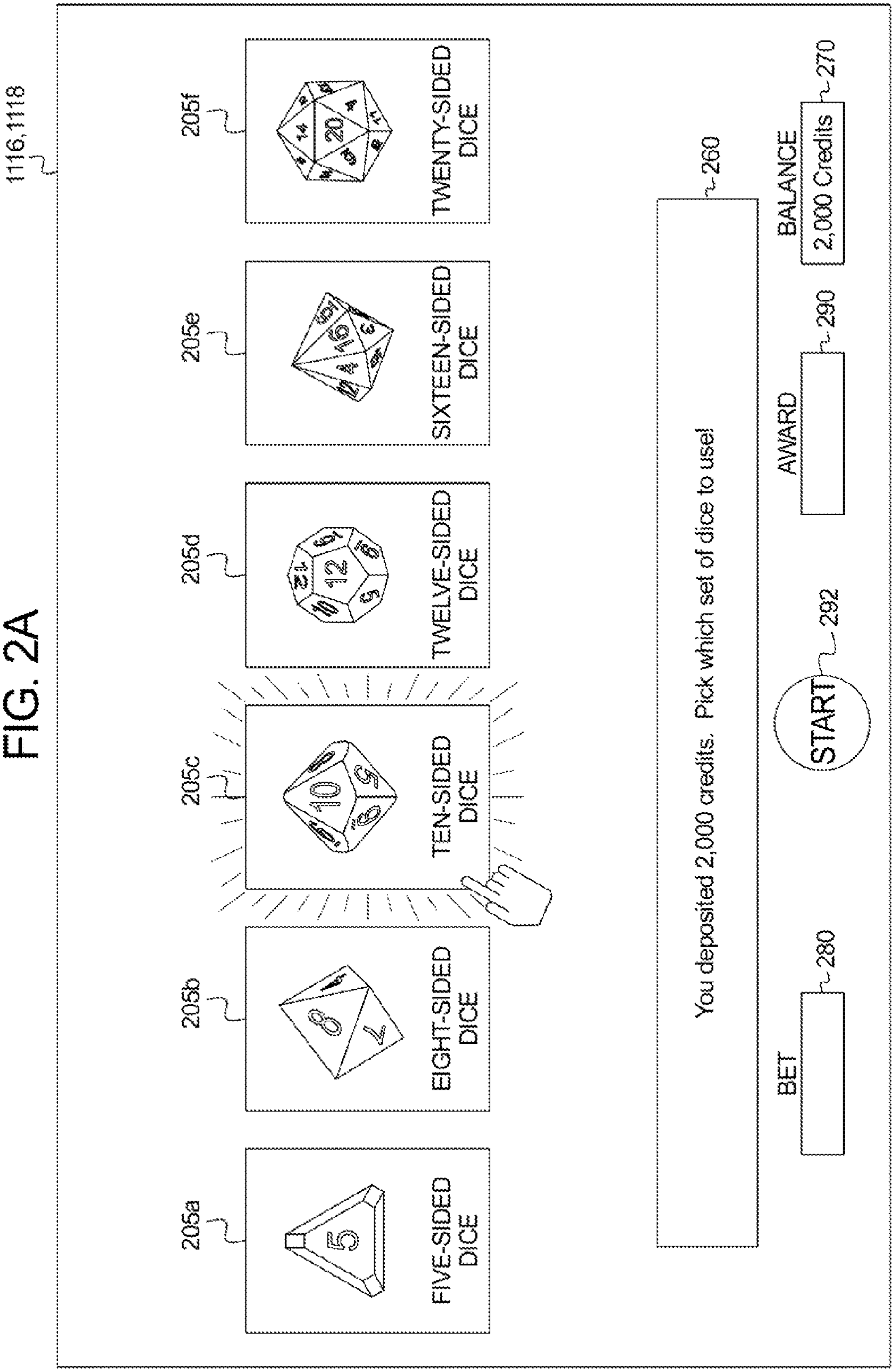
FIGS. 2A, 2B, 2C, 2D, 2E, 2F, 2G, 2H, 2I, 2J, 2K, and 2L illustrate screen shots of one example embodiment of the gaming system of the present disclosure providing a plurality of plays of one example embodiment of the matching game having a player-adjustable volatility

Turning to FIG. 2A, the gaming system receives a deposit of value from the player and establishes a credit balance of 2000 credits, which is displayed in a credit meter 270 (described below). Upon receiving the deposited value, the gaming system enables the player to select which set of dice (and, therefore, which set of digits) to employ for a play of the matching game. Here, the gaming system does so by displaying, such as on a display device 1116 or 1118 (described below), a plurality of dice selection buttons 205*a*, 205*b*, 205*c*, 205*d*, 205*e*, and 205*f*. Here: (a) the dice selection button 205*a* is associated with a set of five digits 1, 2, 3, 4, and 5 and its corresponding set of five-sided dice; (b) the dice selection button 205*b* is associated with a set of eight digits 1, 2, 3, 4, 5, 6, 7, and 8 and its corresponding set of eight-sided dice; (c) the dice selection button 205*c* is associated with a set of ten digits 1, 2, 4, 5, 6, 7, 8, 9, and 10 and its corresponding set of ten-sided dice; (d) the dice selection button 205*d* is associated with a set of twelve digits 1, 2, 3, 4, 5, 6, 7, 8, 9, 10, 11, and 12 and its corresponding set of twelve-sided dice; (e) the dice selection button 205*e* is associated with a set of sixteen digits 1, 2, 3, 4, 5, 6, 7, 8, 9, 10, 11, 12, 13, 14, 15, and 16 and its corresponding set of sixteen-sided dice; and (f) the dice selection button 5*f* is associated with a set of twenty digits 1, 2, 3, 4, 5, 6, 7, 8, 9, 10, 11, 12, 13, 14, 15, 16, 17, 18, 19, and 20 and its corresponding set of twenty-sided dice. The gaming system enables the player to select one of the dice selection buttons, and displays the following message in a message box 200 (described below): "YOU DEPOSITED 2,000 CREDITS PICK WHICH SET OF DICE TO USE!"

Figure 2B:
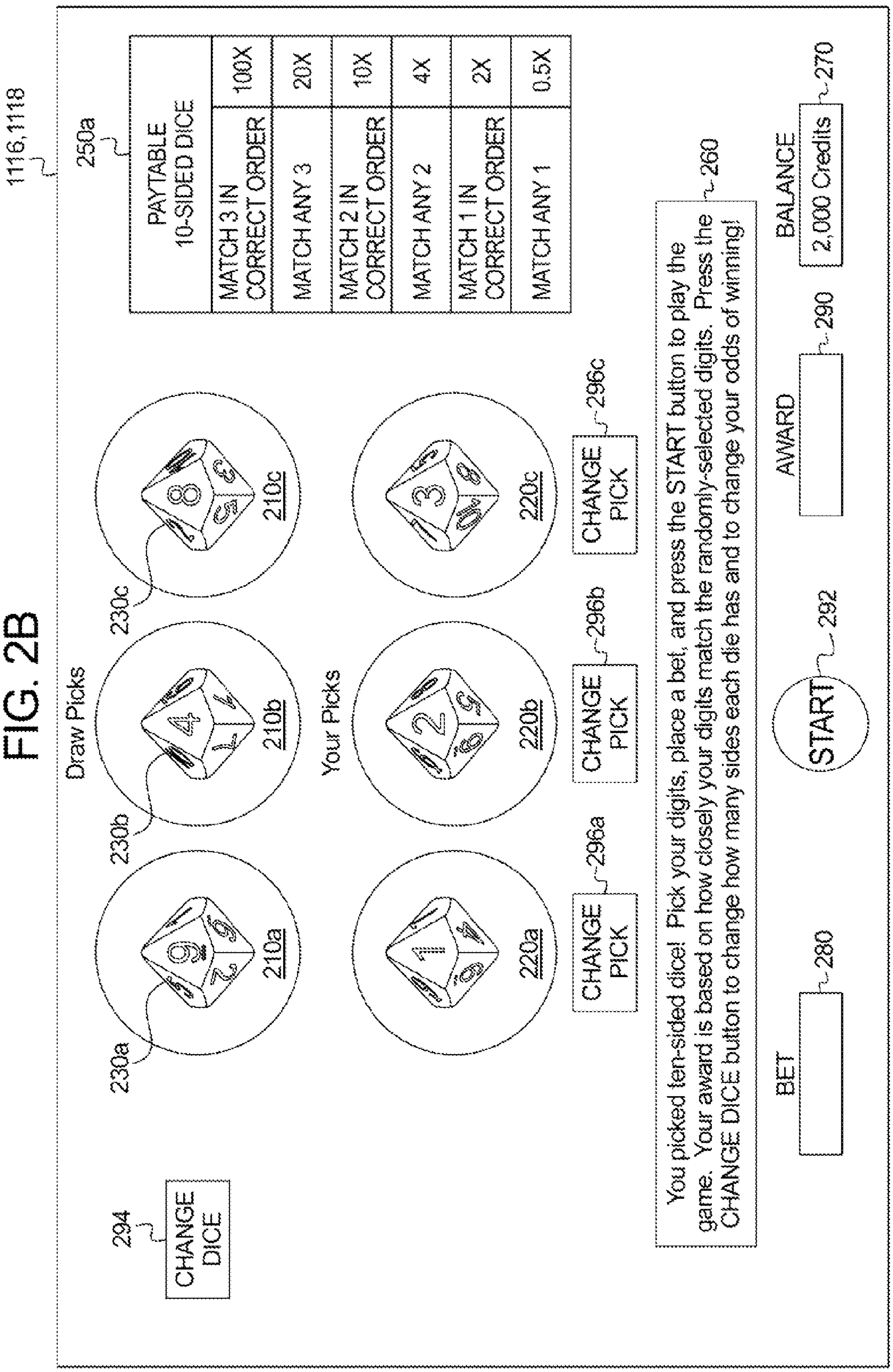

As also shown in FIG. 2A, the gaming system receives an actuation of the ten-sided dice selection button 205*c*. As shown in FIG. 2B, upon receiving the actuation of the ten-sided dice selection button 205*c*, the gaming system displays a plurality of the display areas 210*a*, 210*b*, and 210*c*. Each of the die display areas is configured to display one of the dice of the set of dice associated with the set of digits employed for a play of the matching game, as described below. At this point in this example embodiment the gaming system employs the set of ten digits including the digits 1, 2, 3, 4, 5, 6, 7, 8, 9, and 10 and its corresponding set of ten-sided dice including die 230*a*, die 230*b*, and die 230*c*. Accordingly, the gaming system displays ten-sided die 230*a* at the die display area 210*a*, ten-sided die 230*b* at the die display area 210*b*, and ten-sided die 230*c* at the die display area 210*c*. The gaming system also displays a Change Dice button 294 that, when actuated by the player, causes the gaming system to enable the player to change the set of dice (and, therefore, the set of digits) employed for the play of the Matching game (as described below).

The gaming system displays a plurality of digit display areas 220*a*, 220*b*, and 220*c*, each of which is configured to display one of the player-selected digits for the play of the matching game. The gaming system displays a plurality of Change Pick buttons 296*a*, 296*b*, and 296*c* in association with the digit display areas 220*a*, 220*b*, and a 20*c*, respectively. For each of the Change Pick buttons 296*a*, 296*b*, and 296*c*, when the gaming system receives an actuation of that Change Pick button from the player, the gaming system enables the player to change the player-selected digit displayed at the digit display area associated with that Change Pick button. For instance, if the gaming system receives an actuation of the Change Pick button 296*c*, the gaming system enables the player to select a different one of the digits of the set of digits employed for the play of the wagering matching game, and displays that player-selected digit at the digit display area 220*c*.

The gaming system displays a paytable 250*a* that includes the winning conditions and the awards associated with those winning conditions for the play of the wagering matching game employing the set of ten digits 1, 2, 3, 4, 5, 6, 7, 8, 9, and 10. Generally, in this example embodiment: (a) the awards increase as the quantity of player-selected digits that match different randomly-selected digits increase (and vice versa), and (b) the awards increase as the display order more closely matches the target order (and vice-verse). For instance, if the player-selected digits in the target order include the digits 1, 2, and 3: (a) the gaming system provides 100× the player's wager if the randomly-selected digits in the display order include the digits 1, 2, and 3 (i.e., each player-selected digit matches a different randomly-selected digit and the target order and the display order of the matching digits are the same (1-2-3)); (b) the gaming system provides 20× the player's wager if the randomly-selected digits in the display order include the digits 2, 3, and 1 (i.e., each player-selected digit matches a different randomly-selected digit and the target order and the display order of the matching digits are different); (c) the gaming system provides 10× the player's wager if the randomly-selected digits in the display order include the digits 1, 2, and 9 (i.e., two player-selected charts match different randomly-selected digits and the target order and the display order of the matching digits are the same (1-2-_)); (d) the gaming system provides 4× the player's wager if the randomly-selected digits in the display order include the digits 3, 1, and 8 (i.e., two player-selected digits match different randomly-selected digits and the target order and the display order of the matching digits are different); (e) the gaming system provides 2× the player's wager if the randomly-selected digits in the display order include the digits 1, 9, and 7 (i.e., one player-selected digit matches a randomly-selected digit and the target order and the display order of the matching digits are the same (1-_-_)); and (f) the gaming system provides 0.5× the player's wager if the randomly-selected digits in the display order include the digits 5, 1, and 10 (i.e., one player-selected digit matches a randomly-selected digit and the target order and the display order of the matching digits are different).

The gaming system also displays: (a) the message box 260 in which the gaming system displays a variety of messages or indications before, during, or after play of the matching game; (b) a plurality of meters including: (i) the credit meter 270 in which the gaming system displays the player's credit balance (in credit or currency form), (ii) a pager or bet meter 280 that displays any wager or bet placed on a play of the matching game (in credit or currency form), and (iii) an award meter 290 that displays any awards won for the play of the matching game (in credit or currency form); and (c) a Start button 292 that, when actuated by the player, causes the gaming system to initiate a play of the matching game. While in this illustrated example embodiment the gaming system indicates the player's credit balance, any wagers, and any awards in the form of amount a currency, it should be appreciated that such indications may alternatively or additionally be made in the form of amounts of credits.

Returning to FIG. 2B, the gaming system displays the following message in the message box 260: "YOU PICKED TEN-SIDED DICE! PICK YOUR DIGITS, PLACE A BET, AND PRESS THE START BUTTON TO PLAY THE MATCHING GAME, YOUR AWARD IS BASED ON HOW CLOSELY YOUR DIGITS MATCH THE RANDOMLY-SELECTED DIGITS. PRESS THE CHANGE DICE BUTTON

TO CHANGE HOW MANY SIDES EACH DIE HAS AND TO CHANGE YOUR ODDS OF WINNING?"

Figure 2C:
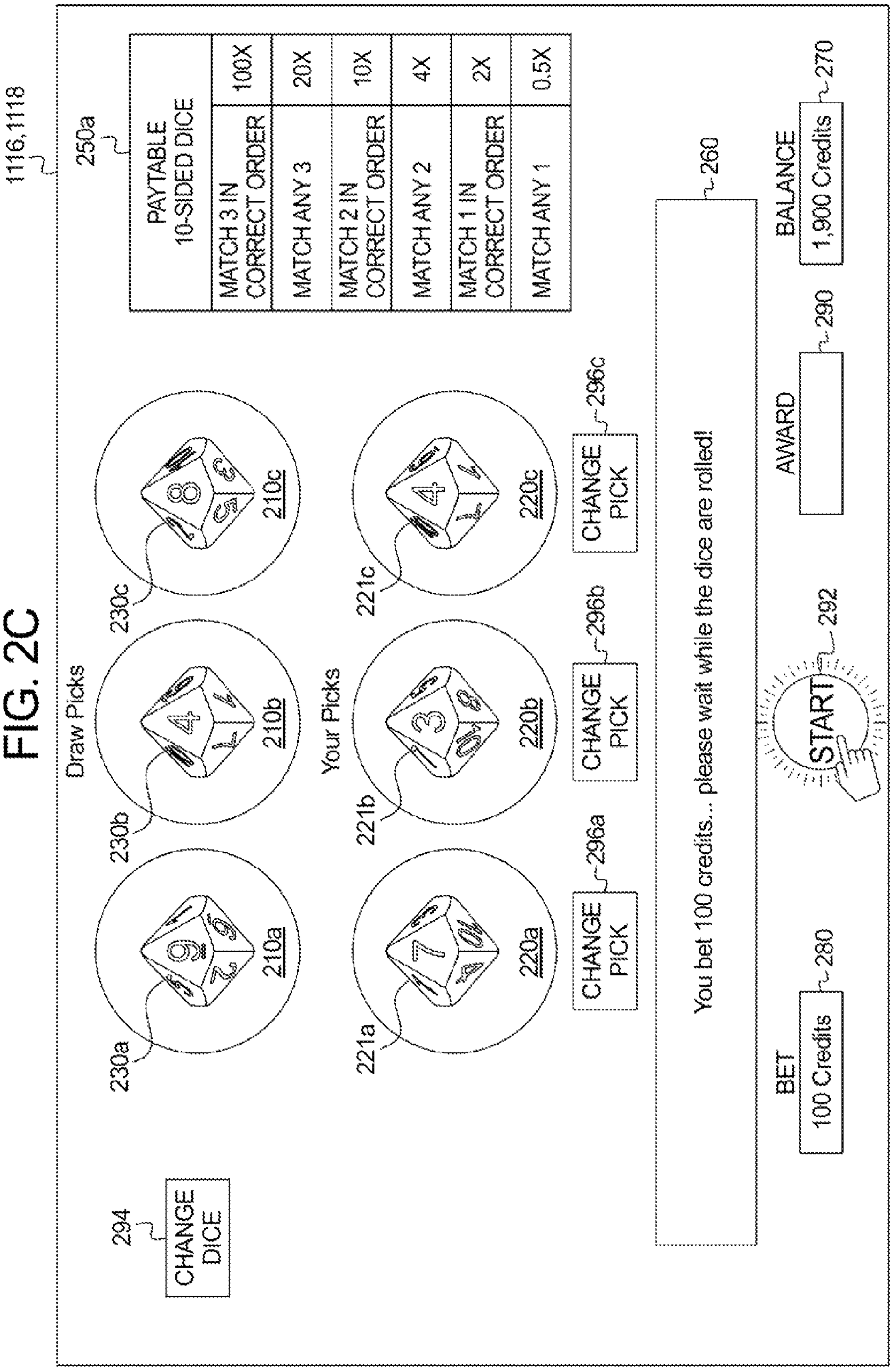

As illustrated in FIG. 2C, the gaming system receives: (a) a wager of 100 credits from the player (as shown in the bet meter 280); (b) a selection of the digit 7, the digit 3, and the digit 4 from the player in the target order 7-3-4; and (c) an actuation of the Start button 292. It should be appreciated that the gaming system may enable the player to specify or set the target order of the player-selected symbols in any suitable manner. The gaming system displays a die 221*a* displaying the player-selected digit 7 at the digit display area 220*a*, a die 221*b* displaying the player-selected digit 3 at the digit display area 220*b*, and a die 221*c* displaying the player-selected digit 4 at the digit display area 220*c*. The gaming system displays the following message in the message box 260: "YOU BET 100 CREDITS PLEASE WAIT WHILE THE DICE ARE ROLLED!"

Figure 2D:
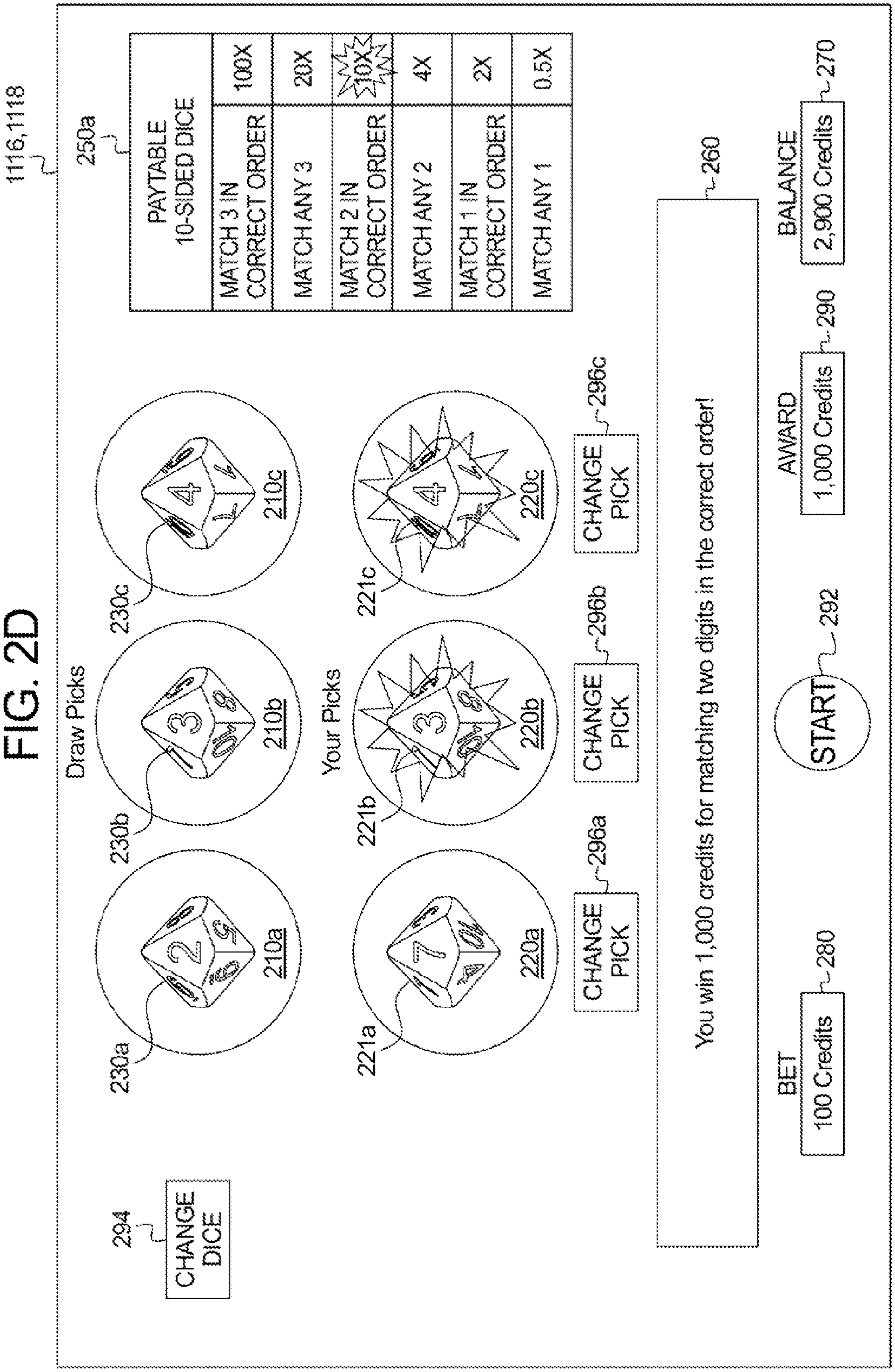

As illustrated in FIG. 2D, the gaming system: (a) randomly selects the digit 2 from the set of ten digits and displays a roll of the ten-sided die 230*a* such that the randomly-selected digit 2 is displayed upward at the die display area 210*a*, (b) randomly selects the digit 3 from the set of ten digits and displays a roll of the ten-sided die 230*b* such that the randomly-selected digit 3 is displayed upward at the die display area 210*b*, and (c) randomly selects the digit 4 from the set of ten digits and displays a roll of the ten-sided die 230*c* such that the randomly-selected digit 4 is displayed upward at the die display area 210*c*. In this example embodiment, the display order is determined from left-to-right; therefore, the randomly-selected digits in the display order include the digits 2-3-4. It should be appreciated that the display order may be determined in any suitable manner, such as from right-to-left instead of from left-to-right.

The gaming system determines any award for the play of the matching game based on the paytable 250*a*. Here, the gaming system determines an award of 1,000 credits (i.e., 10× the player's wager) because two player-selected digits (i.e., player-selected digits 3 and 4) match different randomly-selected digits (i.e., randomly-selected digits 3 and 4) and the target order and the display order of the matching digits are the same (i.e., _-3-4). The gaming system displays the 1,000 credit award in the award meter 290 and updates the player's credit balance displayed in the credit meter 270 to reflect the 1,000 credit award. The gaming system displays the following message in the message box 260: "YOU WIN 1,000 CREDITS FOR MATCHING TWO DIGITS IN THE CORRECT ORDER!"

Figure 2E:
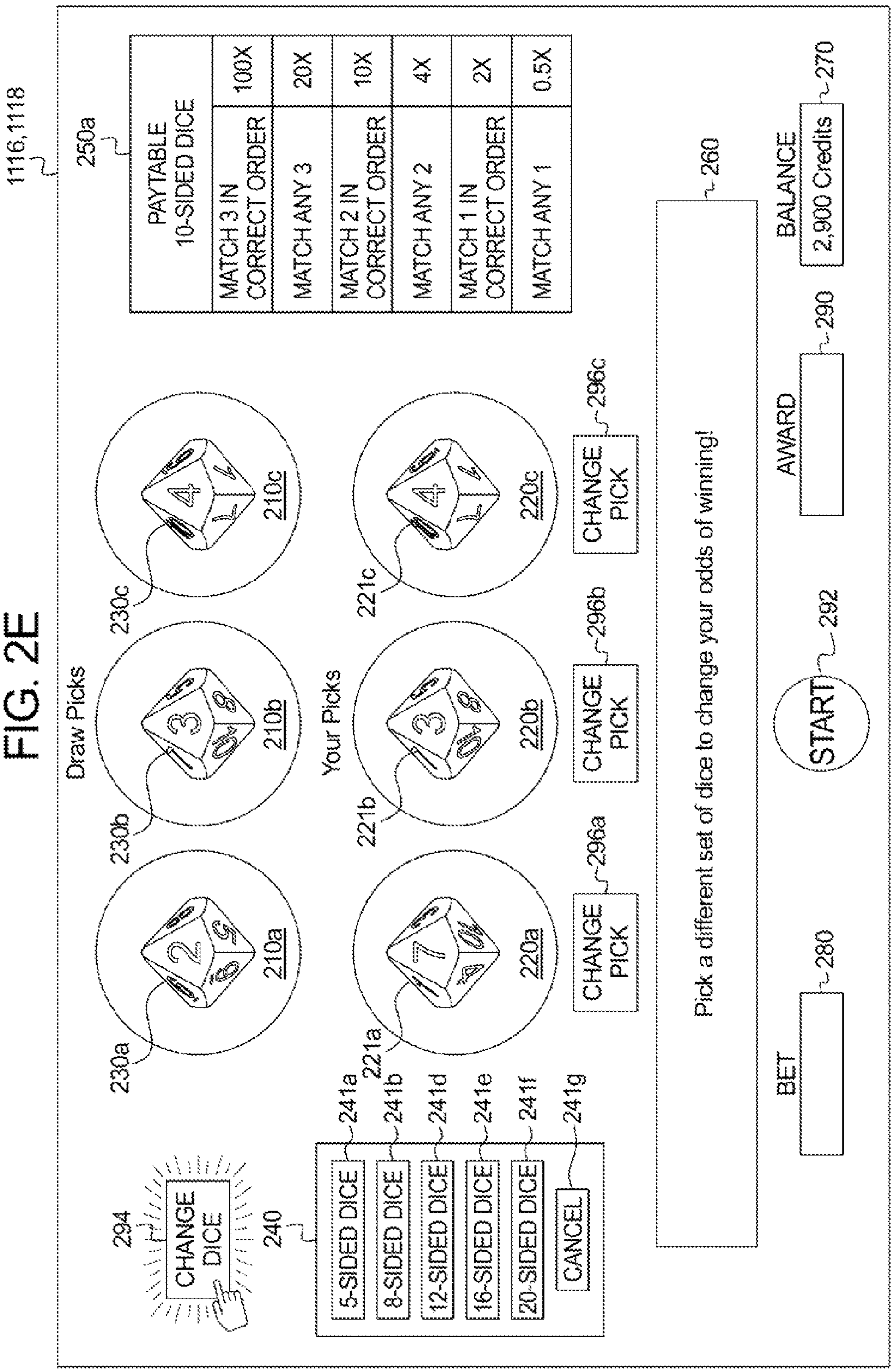

As illustrated in FIG. 2E, the gaming system receives an actuation of the Change Dice button 294 from the player. In response, the gaming system displays a dice change pop-up window 240 that includes: (a) a five-sided dice selection 241*a* that, if selected, causes the gaming system to employ the set of five digits and its corresponding set of five-sided dice for the matching game; (b) an eight-sided dice selection 241*b* that, if selected, causes the gaming system to employ the set of eight digits and its corresponding set of eight-sided dice for the matching game; (c) a twelve-sided dice selection 241*d* that, if selected, causes the gaming system to employ the set of twelve digits and its corresponding set of twelve-sided dice for the matching game; (d) a sixteen-sided dice selection 241*e* that, if selected, causes the gaming system to employ the set of sixteen digits and its corresponding set of sixteen-sided dice for the matching game; (e) a twenty-sided dice selection 241*f* that, if selected, causes the gaming system to employ the set of twenty digits and its corresponding set of twenty-sided dice for the matching game; and (f) a cancel selection 241*g* that, if selected, causes the gaming system to continue employing the set of ten digits and its corresponding set of ten-sided dice for the matching game. The gaming system displays the following message in the message box 260: "PICK A DIFFERENT SET OF DICE TO CHANGE YOUR ODDS OF WINNING!"

Figure 2F:
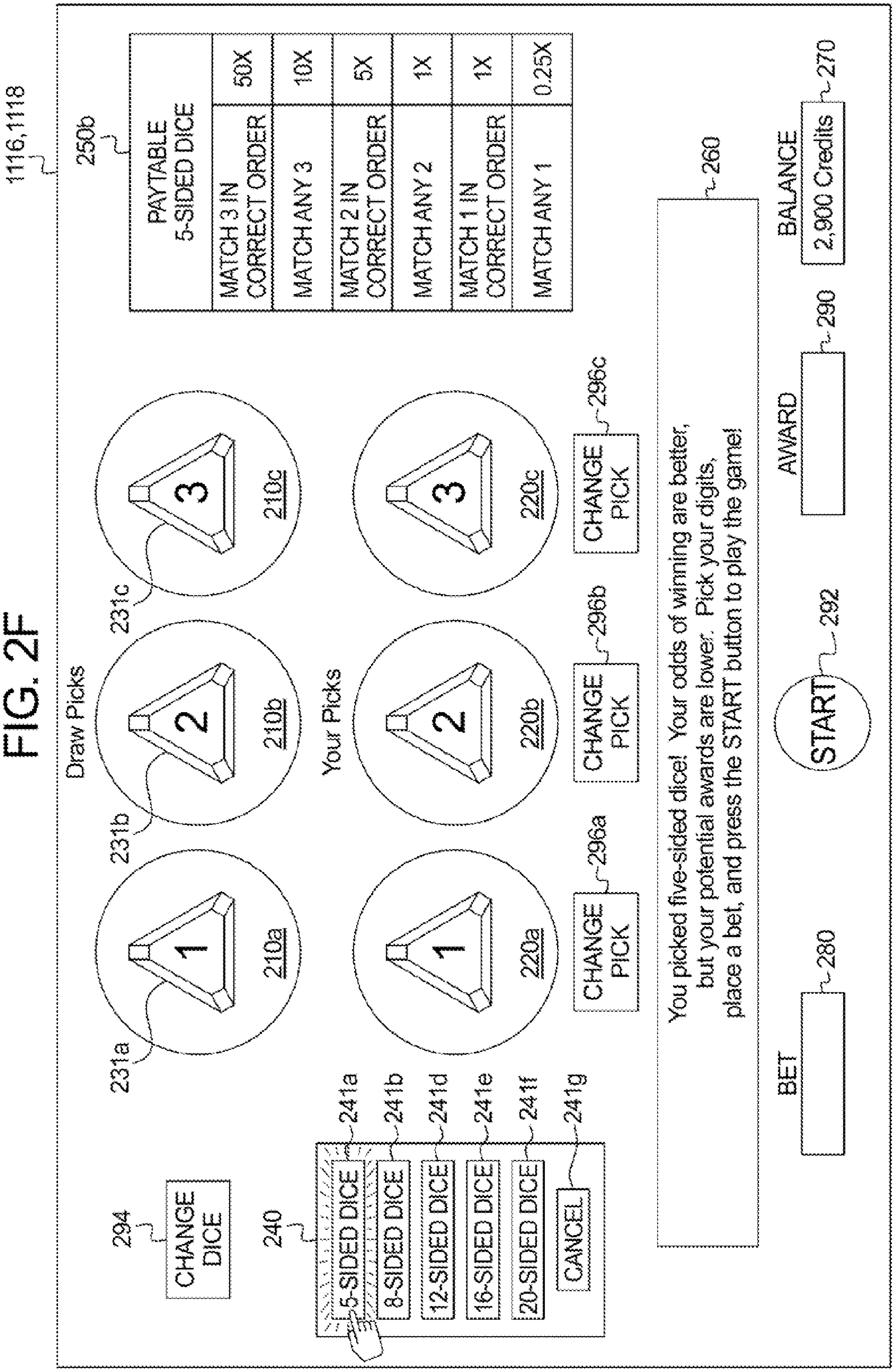

As illustrated in FIG. 2F, the gaming system receives a selection of the five-sided dice selection 241*a* from the player. Accordingly, the gaming system employs the set of five digits and its corresponding set of five-sided dice for the matching game. The gaming system displays five-sided die 231*a* at the die display area 210*a*, five-sided die 231*b* at the die display area 210*b*, and five-sided die 231*c* at the die display area 210*c*. The gaming system replaces the paytable 250*a*, which is associated with the set of ten digits, with paytable 250*b*, which is associated with the set of five digits.

In this example embodiment, the probability of a particular player-selected digit matching one of the randomly-selected digits when the set of five digits is employed (⅕ chance) is double the probability of a particular player-selected digit matching one of the randomly-selected digits when the set of ten digits is employed (1/10 chance). Since the probability that the gaming system will provide one of the awards for a play of the matching game increases due to the switch to the set of five digits, the gaming system reduces (halves in this example embodiment) the values of the awards available to be provided for a play of the matching game to maintain the same average expected payback percentage for the matching game. Thus, while switching from the set of ten digits to the set of five digits provides the player a better chance of winning an award, it also causes each potential award to be smaller compared to its corresponding potential award when the set of ten digits is employed. The gaming system thus provides a lower volatility matching game when the set of five digits is employed than it does when the set of ten digits is employed. The gaming system displays the following message in the message box 260: "YOU PICKED FIVE SIDED DICE! YOUR ODDS OF WINNING ARE BETTER, BUT YOUR POTENTIAL AWARDS ARE SMALLER. PICK YOUR DIGITS, PLACE A BET, AND PRESS THE START BUTTON TO PLAY THE MATCHING GAME!"

It should thus be appreciated that, in this example embodiment, each of the sets of digits is associated with a unique paytable configured to ensure that the average expected payback percentage of the game does not change, regardless of which set of symbols is employed.

Figure 2G:
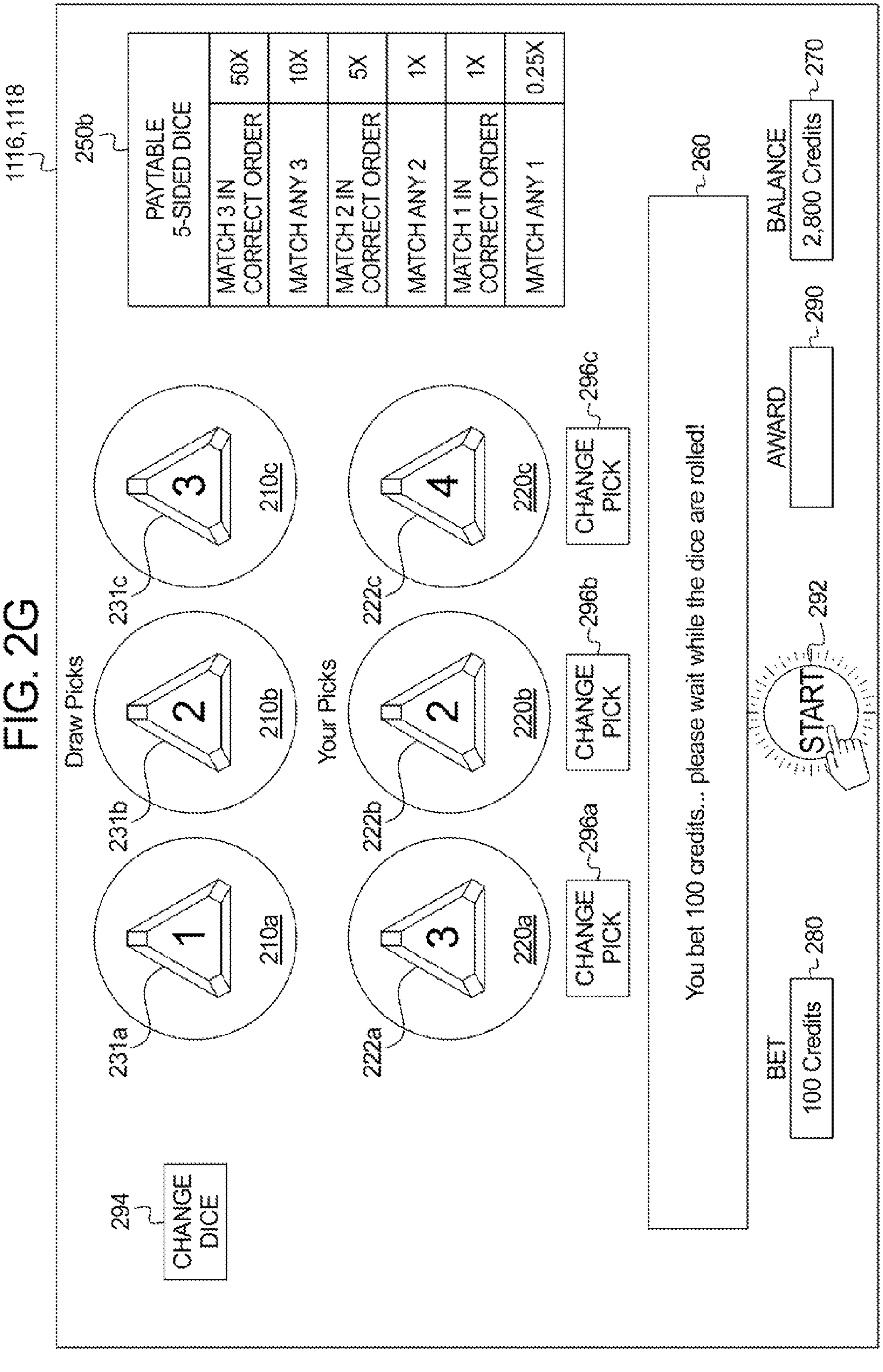

As illustrated in FIG. 2G, the gaming system receives: (a) a wager of 100 credits from the player (as shown in the bet meter 280); (b) a selection of the digit 3, the digit 2, and the digit 4 from the player in the target order 3-2-4; and (c) an actuation of the Start button 292. The gaming system displays a die 222*a* displaying the player-selected digit 3 at the digit display area 220*a*, a die 222*b* displaying the player-selected digit 2 at the digit display area 220*b* and a die 222*c* displaying the player-selected digit 4 at the digit display area 220*c*. The gaming system displays the following message in the message box 260: "YOU BET 100 CREDITS . . . PLEASE WAIT WHILE THE DICE ARE ROLLED!"

Figure 2H:
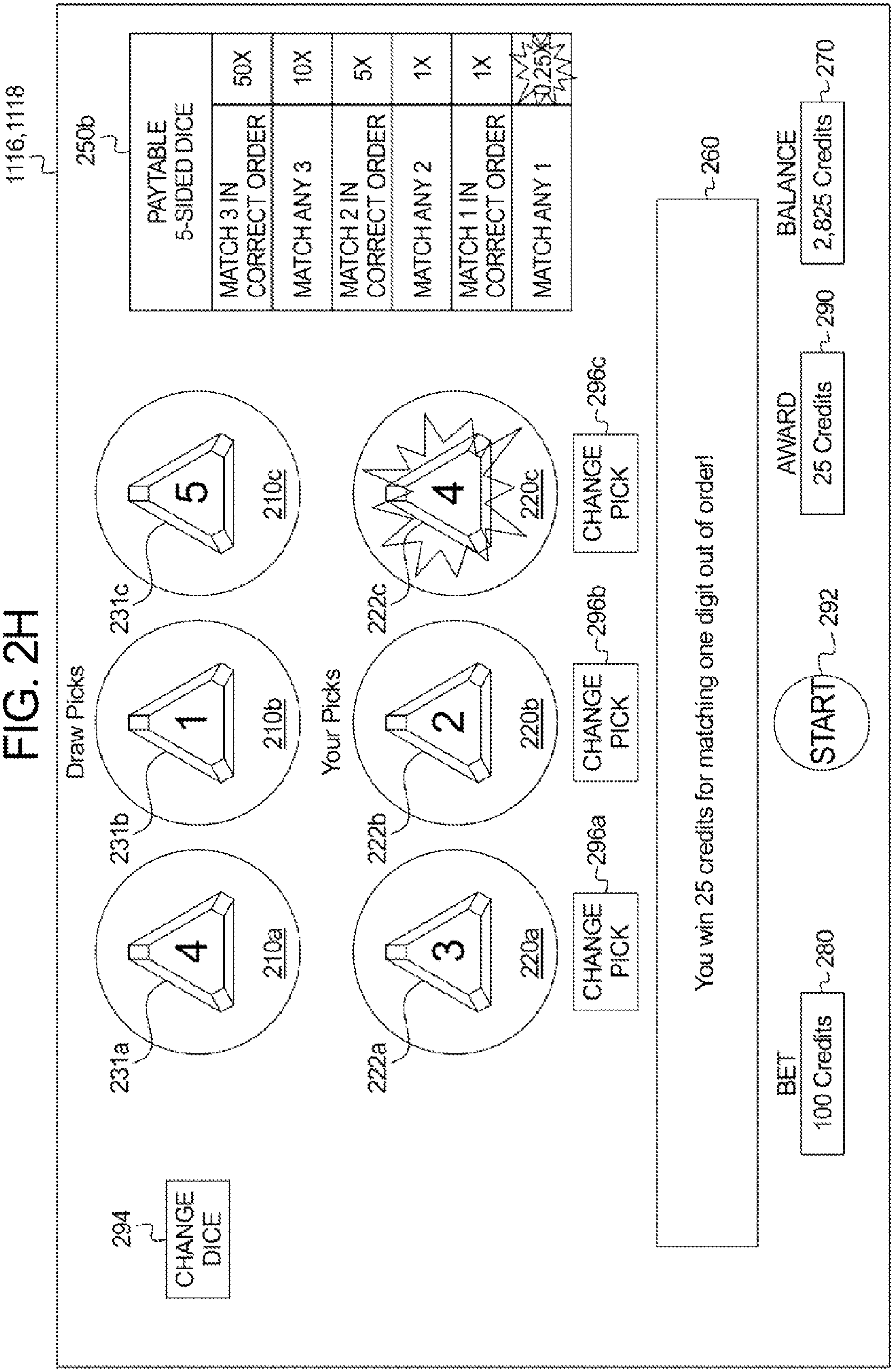

As illustrated in FIG. 2H, the gaming system receives: (a) randomly selects the digit 4 from the set of five digits and displays a roll of the five-sided die 231*a* such that the randomly-selected digit 4 is displayed upward at the die display area 210*a*, (b) randomly selects the digit 1 from the set of five digits and displays a roll of the five-sided die 231*b* such that the randomly-selected digit 1 is displayed upward at the die display area 210*b*, and (c) randomly selects the digit 5 from the set of five digits and displays a roll of the five-sided die 231*c* such that the randomly-selected digit 5 is displayed upward at the die display area 210*c*. In this example embodiment, the display order is determined from left-to-right, therefore, the randomly-selected digits in the display order include the digits 4-1-5.

The gaming system determines any award for the play of the matching game based on the paytable 250*b*. Here, the gaming system determines an award of 25 credits (i.e., 0.5× the player's wager) because one player-selected digit (i.e., player-selected digit 4) matches a randomly-selected digit (i.e., randomly-selected digit 4) and the target order and the display order of the matching digits are different. The gaming system displays the 25 credit award in the award meter 290 and updates the player's credit balance displayed in the credit meter 270 to reflect the 25 credit award. The gaming system displays the following message in the message box 260: "YOU WIN 25 CREDITS FOR MATCHING ONE DIGIT OUT OF ORDER!"

Figure 2I:
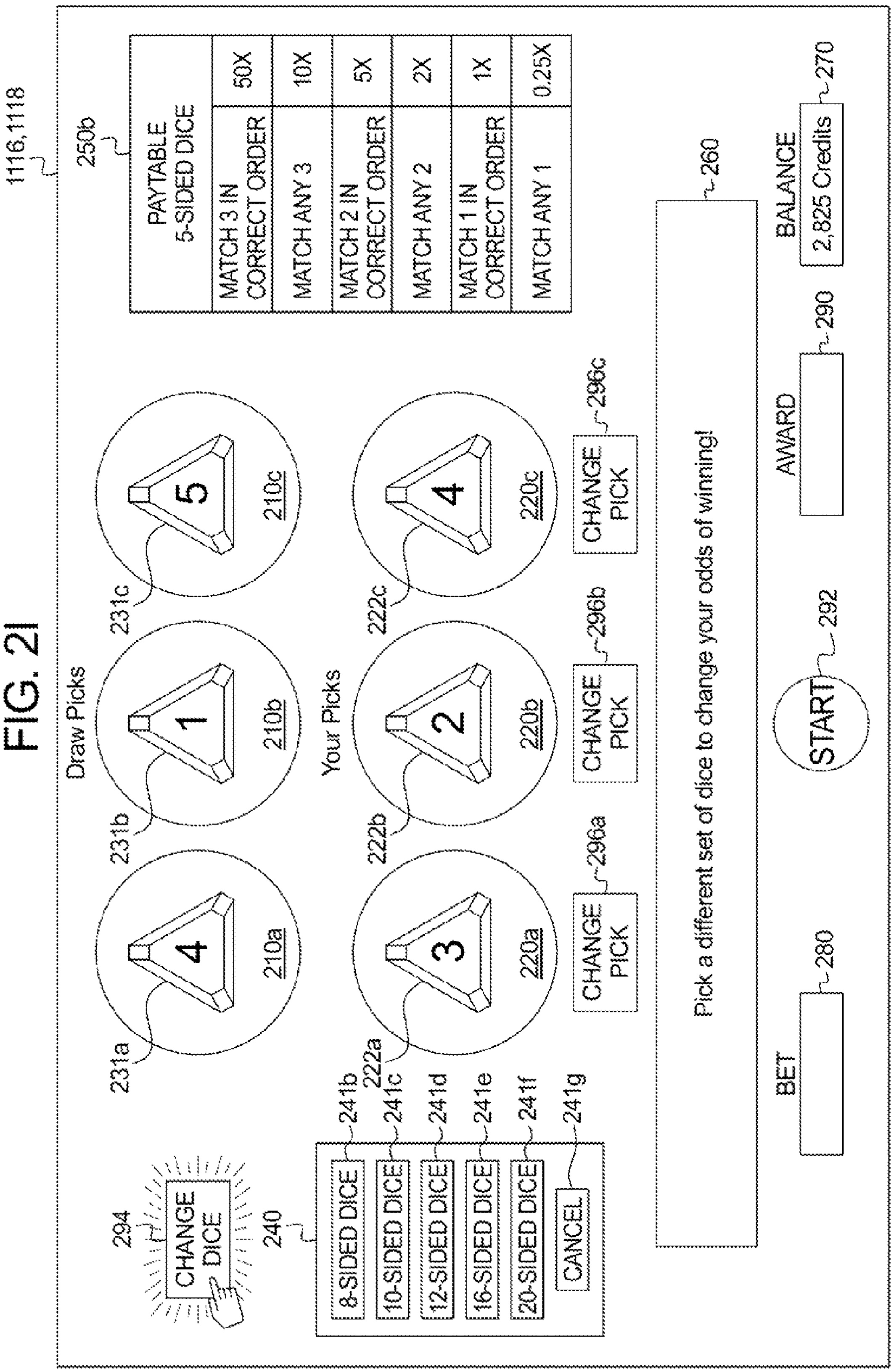

As illustrated in FIG. 2I, the gaming system receives an actuation of the Change Dice button 204 from the player. In response, the gaming system displays the dice change pop-op window 240 that includes: (a) the eight-sided dice selection 241*b*; (b) a ten-sided dice selection 241*c* that, if selected, causes the gaming system to employ the set of ten digits and its corresponding set of ten-sided dice 230*a*, 230*b*, and 230*c* for the matching game; (c) the twelve-sided dice selection 241*d*; (d) the sixteen sided dice selection 241*e*; (e) the twenty-sided dice selection 241*f*; and (f) the cancel selection 241*g*. The gaming system displays the following message in the message box 260: "PICK A DIFFERENT SET OF DICE TO CHANGE YOUR ODDS OF WINNING!"

Figure 2J:
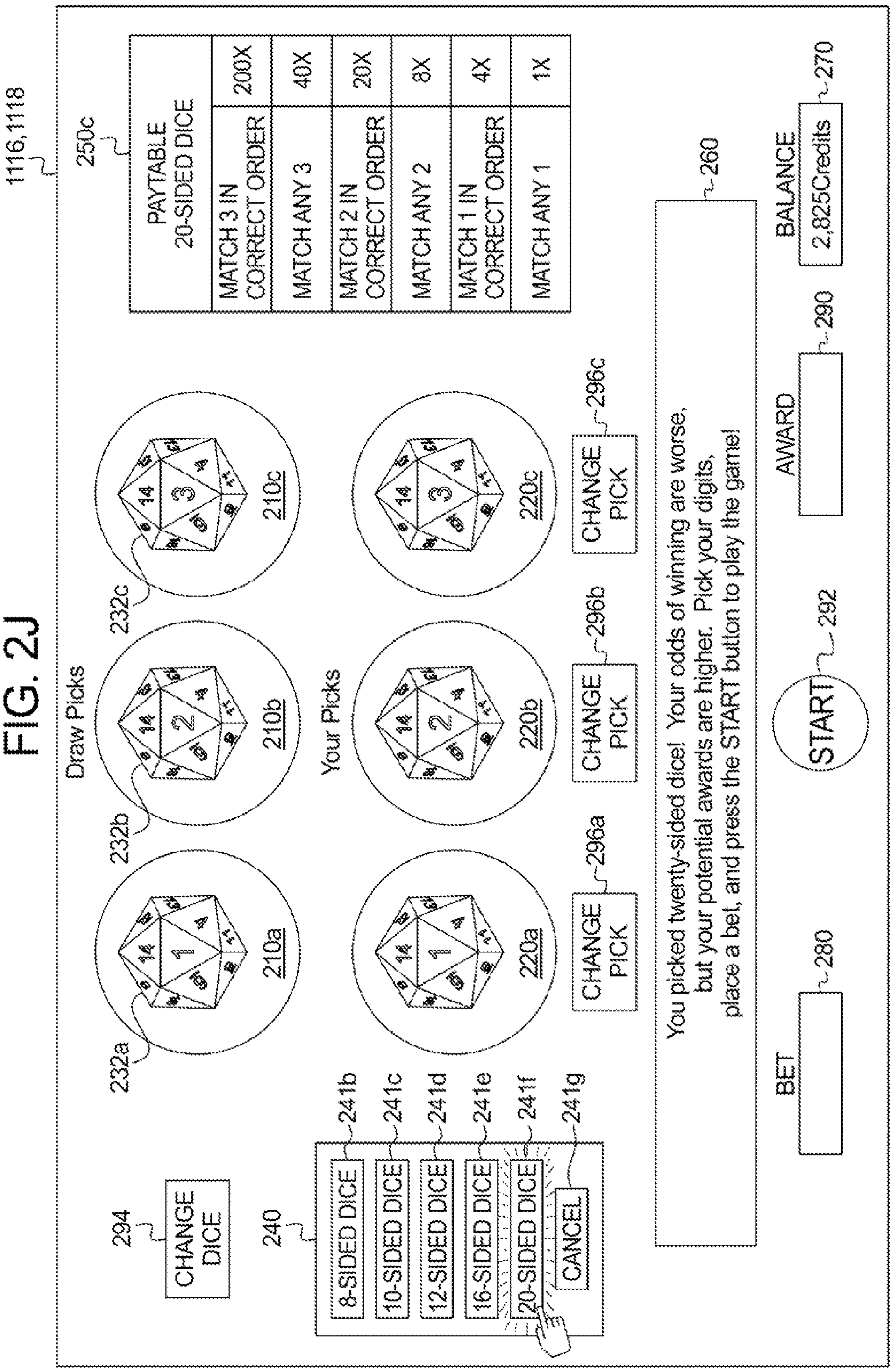

As illustrated in FIG. 2J, the gaming system receives a selection of the twenty-sided dice selection 241*e* from the player. Accordingly, the gaming system employs the set of twenty digits and its corresponding set of twenty-sided dice for the matching game. The gaming system displays twenty-sided die 232*a* at the die display area 210*a*, twenty-sided die 232*b* at the die display area 210*b*, and twenty-sided die 232*c* at the die display area 210*c*. The gaming system replaces the paytable 250*b*, which is associated with the set of five digits, with paytable 250*c*, which is associated with the set of twenty digits.

In this example embodiment, the probability of a particular player selected digit matching one of the randomly-selected digits when the set of twenty digits is employed (1/20 chance) is one-fourth of the probability of a particular player-selected digit matching one of the randomly-selected digits when the set of five digits is employed (1/5 chance). Since the probability that the gaming system will provide one of the awards for a play of the matching game decreases due to the switch to the set of twenty digits, the gaming system increases (increases fourfold in this example embodiment) the values of the awards available to be provided for a play of the matching game to maintain the same average expected payback percentage for the matching game. Thus, while switching from the set of five digits to the set of twenty digits provides the player a worse chance of winning an award, it also causes each potential award to be larger compared to its corresponding potential award when the set of five digits is employed. The gaming system thus provides a higher volatility matching game when the set of twenty digits is employed than it does when the set of five digits is employed. The gaming system displays the following message in the message box 260: "YOU PICKED TWENTY-SIDED DICE! YOUR ODDS OF WINNING ARE WORSE, BUT YOUR POTENTIAL AWARDS ARE LARGER. PICK YOUR DIGITS, PLACE A BET, AND PRESS THE START BUTTON TO PLAY THE MATCHING GAME!"

Figure 2K:
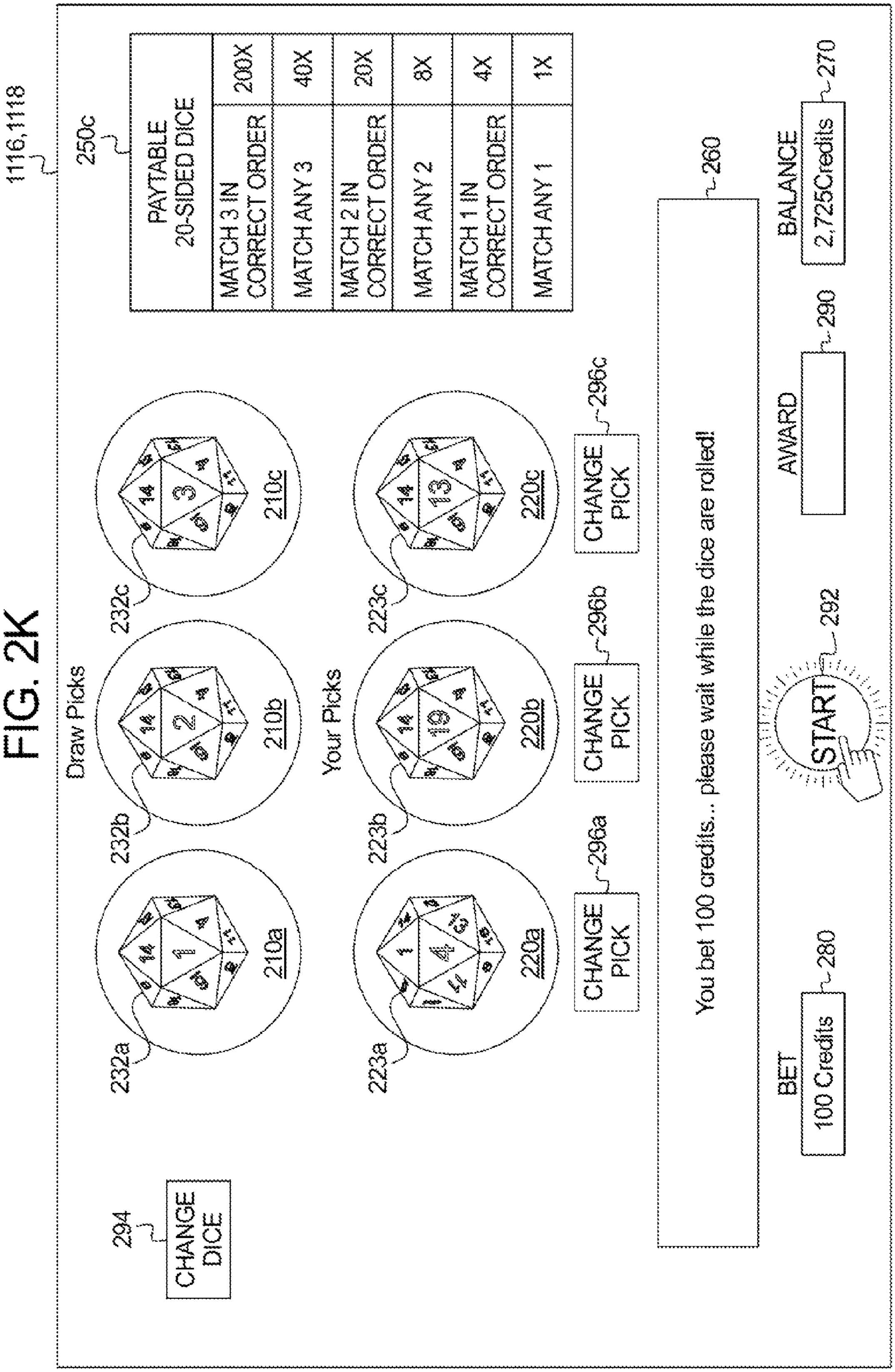

As illustrated in FIG. 2K, the gaming system receives: (a) a wager of 100 credits from the player (as shown in the bet meter 280); (b) a selection of the digit 4, the digit 19, and the digit 13 from the player in the target order 4-19-13; and (c) an actuation of the Start button 292. The gaming system displays a die 223*a* displaying the player-selected digit 4 at the digit display area 220*a*, a die 223*b* displaying the player-selected digit 19 at the digit display area 220*b*, and a die 223*c* displaying the player-selected digit 13 at the digit display area 220*c*. The gaming system displays the following message in the message box 260: "YOU BET 100 CREDITS . . . PLEASE WAIT WHILE THE DICE ARE ROLLED!"

Figure 2L:
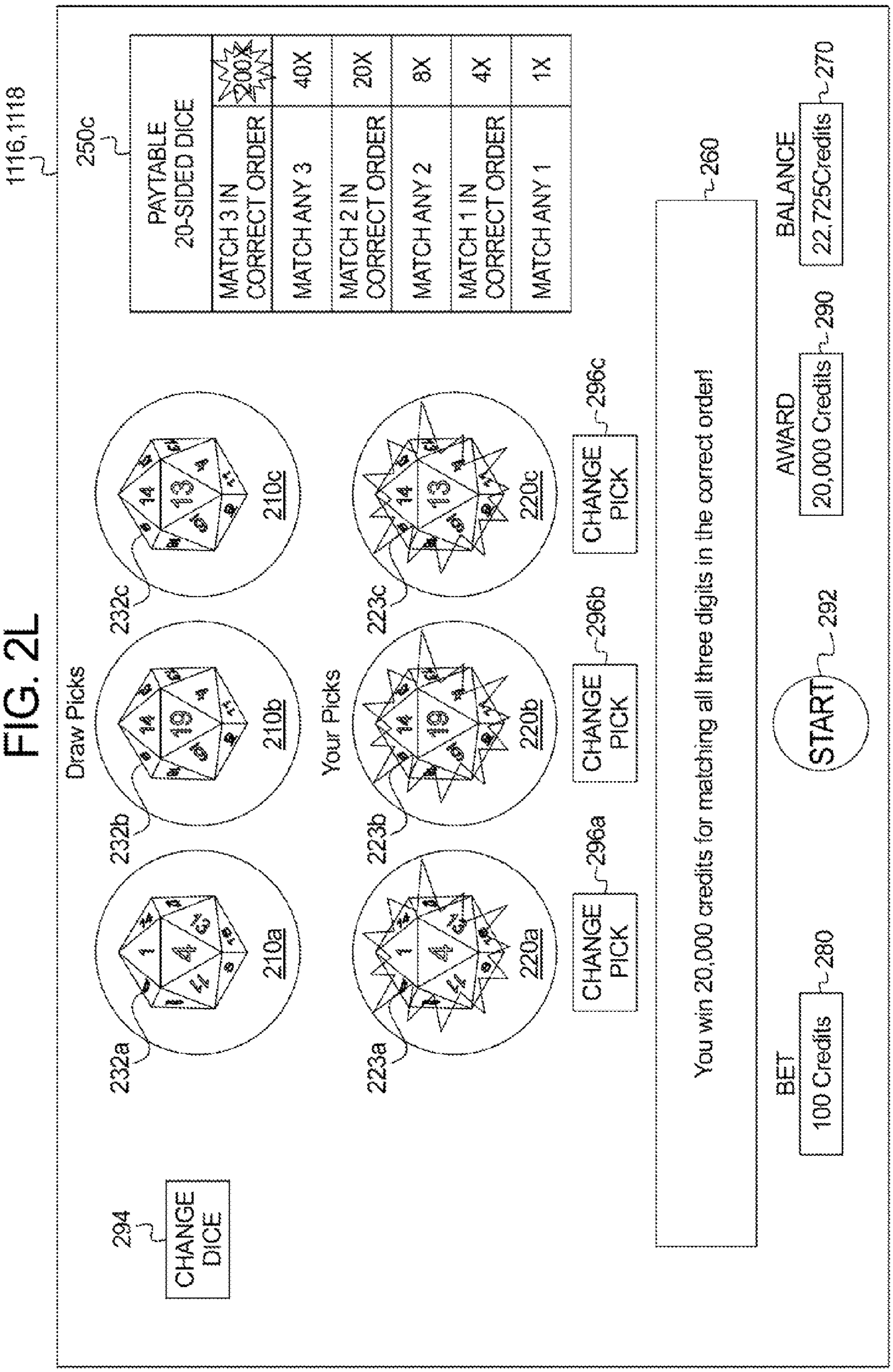

As illustrated in FIG. 2L, the gaming system: (a) randomly selects the digit 4 from the set of twenty digits and displays a roll of the twenty-sided die 232*a* such that the randomly-selected digit 4 is displayed upward at the die display area 210*a*, (b) randomly selects the digit 19 from the set of twenty digits and displays a roll of the twenty-sided die 232*b* such that the randomly-selected digit 19 is displayed upward at the die display area 210*b*, and (c) randomly selects the digit 13 from the set of twenty digits and displays a roll of the twenty-sided die 232*c* such that the randomly-selected digit 13 is displayed upward at the die display area 210*c*. In this example embodiment the display order is determined from left-to-right therefore, the randomly-selected digits in the display order include the digits 4-19-13.

The gaming system determines any award for the play of the matching game based on the paytable 250*c*. Here, the gaming system determines an award of 20,000 credits (i.e., 200× the player's wager) because all three player-selected digits (i.e., player-selected digits 4, 19, and 13) match different randomly-selected digits (i.e., randomly-selected digits 4, 19, and 13) and the target order and the display order of the matching digits are the same (i.e., 4-19-13). The gaming system displays the 20,000 credit award in the award meter 290 and updates the player's credit balance displayed in the credit meter 270 to reflect the 20,000 credit award. The gaming system displays the following message in the message box 260: "YOU WIN 20000 CREDITS FOR MATCHING ALL THREE DIGITS IN THE CORRECT ORDER!"

While the example embodiment of the matching game described above with respect to FIGS. 2A to 2L is a one-dimensional matching game, it should be appreciated that the matching game may be employed two dimensions, such as with 3×3 matrix of symbol display areas, or in three dimensions, such as with a 3×3×3 matrix of symbol display areas, as described in U.S. Pat. No. 8,430,737 B2.

In other embodiments, the gaming system enables the player to select a plurality of sets of symbols from which to select the player's symbols for a play of the matching game. If the player selects the player's symbols for the play of the matching game from more than one set of symbols, for each player-selected symbol, the gaming system randomly selects one of the symbols from the set of symbols from which the player selected that player-selected symbol. For instance, in one example embodiment, the gaming system receives, from a player: (a) a selection of a set of five symbols, (b) a selection of a set of ten symbols, and (c) a selection of a set of twenty symbols. The gaming system receives, from the player: (a) a selection of one of the symbols of the set of five symbols, (b) a selection of one of the symbols of the set of ten symbols, and (c) a selection of one of the symbols of the set of twenty symbols. The gaming system: (a) randomly selects one of the symbols of the set of five symbols, (b) randomly selects one of the symbols of the set of ten symbols, and (c) randomly selects one of the symbols of the set of twenty symbols. It should be appreciated that, in these embodiments, the gaming system enables the player to further tailor the volatility of the game to the player's liking.

In certain embodiments, the gaming system: (a) enables the player to select the designated quantity of the symbols of the player-selected set of symbols without replacement, and (b) random selects the designated quantity of the symbols of the player-selected set of symbols without replacement. Put differently, once the gaming system receives the player's selection of one of the symbols of the player-selected set of symbols for a play of the matching game, the gaming system does not enable the player to select that symbol again for the play of the matching game. Similarly, once the gaming system randomly selects one of the symbols of the player-selected set of symbols for the play of the matching game, the gaming system does not randomly select that same symbol again for the play of the matching game. Thus, in certain instances: (a) the plurality of player-selected symbols are different, and (b) the plurality of randomly-selected symbols are different.

In further embodiments, the gaming system enables the player to cause the gaming system to randomly select one or more of the player-selected symbols. For instance, in one example embodiment, the gaming system includes a Quick Pick button that, when actuated by the player, causes the gaming system to randomly select the designated quantity of player-selected symbols from the set of symbols employed for the play of the matching game.

In certain embodiments, instead of or in addition to changing the values of one or more of the awards, the gaming system adds or removes one or more awards available to be provided when the gaming system switches from employing one set of symbols to employing another set of symbols to maintain the same average expected payback percentage of the matching game.

In various embodiments, instead of or in addition to changing the values of one or more of the awards, the gaming system activates or deactivates one or more features or additional award opportunities available to be provided when the gaming system switches from employing one set of symbols to employing another set of symbols to maintain the average expected payback percentage of the matching game. For instance, in one example embodiment, the gaming system activates a bonus game (i.e., enables the player to trigger the bonus game) when the gaming system switches from one set of symbols to another set of symbols to maintain the average expected payback percentage of the matching game, and vice-versa.

It should be appreciated that the symbols may be any suitable symbols such as (but not limited to): digits, symbols on slot machine reels, shapes, playing cards, and/or colors.

It should be appreciated that a player-selected symbol may correspond to a randomly-selected symbol in any suitable manner. For instance, in various example embodiments, two symbols correspond to one another when those symbols: (a) match; (b) are the same color (e.g., are both blue); (c) have the same background (e.g., share an underwater background); (d) sum to at least a designated value (e.g., the symbols A♠ and K♠ form a Blackjack); (e) are complementary (e.g., one symbol is a lock and the other symbol is a key); (f) form a designated word (e.g., one symbol is "WI" and the other symbol "N"); (g) form a designated phrase (e.g., one symbol is "YOU" and the other symbol is "WIN"); and/or (h) are the same shape (e.g., are both four-sided or are both rectangular).

In certain embodiments, the matching game is associated with one or more Wild symbols. In these embodiments, the gaming system does not enable the player to select the Wild symbol, but the gaming system may randomly select the Wild symbol when picking the randomly-selected symbols. In these embodiments, when the Wild symbol is one of the randomly-selected symbols, that Wild symbol acts as whichever symbol would maximize the award for the play of the matching game.

In one example embodiment in which the matching game is associated with one or more Wild symbols, each set of symbols includes a same quantity of symbols and a different quantity of Wild symbols. In this example embodiment, for a play of the matching game, the gaming system receives a selection of one of the sets of symbols from the player to employ for the play of the matching game. In this example embodiment, the player-selected set of symbols and, more particularly, the quantity of Wild symbols included in the player-selected set of symbols, determines the volatility of the play of the matching game. More specifically, in this example embodiment, the gaming system determines the award or awards available to be provided for the play of the matching game and the probabilities of the gaming system providing those awards for the play of the matching game based on the player-selected set of symbols. Here, as the quantity of Wild symbols included in the player-selected set of symbols increases, the likelihood that the gaming system will provide an award for the play of the matching game increases, and vice-versa. To compensate for this increased likelihood of the gaming system providing an award and to maintain the same average expected payback percentage for the matching game, the gaming system decreases the amount of at least one award available to be provided as the quantity of Wild symbols included in the player-selected set of symbols increases, and vice-versa. Thus, in this example embodiment, if the player-selected set of symbols includes a relatively small quantity of Wild symbols, the gaming system provides a relatively high-volatility play of the matching game in which the gaming system provides relatively large awards relatively infrequently. Conversely, if the player-selected set of symbols includes a relatively large quantity of Wild symbols, the gaming system provides a relatively low-volatility play of the matching game in which the gaming system provides relatively small awards relatively frequently.

In another example embodiment in which the matching game is associated with one or more Wild symbols, each set of symbols includes a quantity of symbols and a different quantity of Wild symbols. In this example embodiment, at least two of the sets of symbols include different quantities of symbols. In this example embodiment, for a play of the matching game, the gaming system receives a selection of one of the sets of symbols from the player to employ for the play of the matching game. In this example embodiment, the player-selected set of symbols and, more particularly, the quantity of Wild symbols and the quantity of symbols included in the player-selected set of symbols, determines the volatility of the play of the matching game.

In certain embodiments, the matching game is associated with one or more Bonus symbols. In these embodiments, the gaming system does not enable the player to select the Bonus symbol, but the gaming system may randomly select the Bonus symbol when picking the randomly-selected symbols. In these embodiments, if a designated quantity of the randomly-selected symbols (such as all of the randomly selected symbols) are Bonus symbols, the gaming system provides a bonus, such as a bonus award or an additional award opportunity (such as a play of a bonus game).

In one example embodiment in which the matching game is associated with one or more Bonus symbols, each set of symbols includes a same quantity of symbols and a different quantity of Bonus symbols (though it should be appreciated that in other embodiments, at least two sets of symbols include different quantities of symbols). Here, the gaming system provides a play of a bonus game when the randomly-selected symbols include a designated quantity of Bonus symbols. In this example embodiment, the matching game has a total average expected payback percentage that includes a primary average expected payback percentage associated with the primary game and a bonus average expected payback percentage associated with the bonus game.

For a play of the matching game, the gaming system receives a selection of one of the sets of symbols from the player to employ for the play of the matching game. In this example embodiment, the player-selected set of symbols and more particularly, the quantity of Bonus symbols included in the player-selected set of symbols, determines the volatility of the play of the matching game and the volatility of the play of the bonus game (if triggered). More specifically, in this example embodiment, the gaming system determines the award or awards available to be provided for the play of the matching game and for the play of the bonus game if triggered) and the probabilities of the gaming system providing those awards for the play of the matching game and the play of the bonus game (if triggered) based on the player-selected set of symbols.

Here, as the quantity of Bonus symbols included in the player-selected set of symbols increases: (a) the likelihood that the gaming system will provide an award for the play of the matching game decreases, and vice-versa; and (b) the likelihood that the gaming system will trigger the play of the bonus game increases, and vice-versa. To compensate for this decreased likelihood of the gaming system providing an award for the play of the matching game and to maintain the same average expected payback percentage for the primary game, the gaming system increases the amount of at least one award available to be provided as the quantity of Bonus symbols included in the player-selected set of symbols increases, and vice-versa. Similarly, to compensate for this increased likelihood of the gaming system triggering the play of the bonus game and to maintain the same average expected payback percentage for the bonus game, the gaming system decreases the amount of at least one award available to be provided as the quantity of Bonus symbols inducted in the player-selected set of symbols increases, and vice-versa.

In various embodiments, the symbols are the values, the suits, or the suits and values of playing cards. In one example embodiment, the largest set of symbols includes all fifty-two playing cards of a standard deck of playing cards. In this embodiment, the gaming system enables the player to customize the set of playing cards employed for a play of the matching game (and, therefore the volatility of that play of the matching game) by determining whether to remove any playing cards from the set and, if so, which particular playing cards to remove from the set. For instance, if the player removes all Twos and all Tens from the set, the gaming system increases the likelihood that the player will win an award, but decreases the values of the awards available to be provided (i.e., lowers the volatility).

It should be appreciated that the present disclosure contemplates that any suitable game may be employed instead of (or in addition to) a matching game. In certain embodiments, the gaming system provides a card game, such as a poker game (e.g., Texas Hold 'Em) or a blackjack game, and enables the player to at least partially control the cards included in the deck (or decks) of cards employed for the card game to at least partially control the volatility of the card game. For instance, in one example embodiment in which the card game is a blackjack game, the gaming system enables the player to remove all cards having a particular value from the deck for decks) of cards employed for the blackjack game, and modifies the awards available to be won based on the removed cords to maintain the same average expected payback percentage for the blackjack game. In this example embodiment, removing all Twos from the deck (or decks) of cards would have a different effect on the volatility of the blackjack game (i.e., the awards available to be provided and the probability of those awards being provided) than removing all Aces or Kings from the deck (or decks).

In other embodiments, the gaming system provides a slot game associated with a plurality of reels and enables the player to at least partially control the symbols included on at least one of the reels to at least partially control the volatility of the slot game. For instance, in one example embodiment, the gaming system enables the player to instruct the gaming system to remove at least one instance of one symbol from the reels, and modifies: (a) the awards available to be won (b) the weightings of the symbols remaining on the reels, or (c) both (a) and (b) based on the removed symbols to maintain the same average expected payback percentage for the slot game. In this example embodiment, removing a major symbol from the reels would have a different effect on the volatility of the slot game than removing a minor symbol from the reels.

In various embodiments, the average expected payback percentage for the matching game is not the same for each player-selected set of symbols. In certain such embodiments, each set of symbols is associated with one of a plurality of different average expected payback percentages, and the gaming system determines the average expected payback percentage for the matching game based on the player selected set of symbols. In one such embodiment, the matching game is associated with a range of average expected payback percentages, and the paytables associated with the player-selected sets of symbols are set such that the average expected payback percentage associated with each player-selected set of symbols falls within that range. For instance, in one example embodiment, the matching game is associated with a range of average expected payback percentages from 92% to 96%. In this example embodiment, as the quantity of symbols in the player-selected set of symbols increases, the average expected payback percentage associated with the player-selected set of symbols increases. Thus, in this embodiment, the average expected payback percentage of the game played at a high volatility is greater than the average expected payback percentage of the game played at a low volatility.

In other such embodiments, the average expected payback percentage for the matching game is within designated range regardless of the set of symbols employed for a play of the matching game. For instance, in one example embodiment, the average expected payback percentage for the play of the matching game is between 91.5% and 92.5% regardless of the set of symbols employed for the play of the matching game.

In various embodiments, rather than enabling the player to determine the volatility for a play of the matching game is selection of the set of symbols to employ for the play of the matching game, the gaming system enables the player to select one of a plurality of different volatilities, and automatically selects a set of symbols to employ for the play of the game such that the play of the game has the selected volatility. For instance, in one example embodiment, the gaming system enables the player to select one of the following volatilities for a play of the matching game: (a) a high volatility, (b) a medium volatility, and (c) a low volatility. In this example embodiment, if the gaming system receives a selection from the player of: (a) the high volatility, the gaming system provides the play of the matching game employing a set of twenty symbols; (b) the medium volatility, the gaming system provides the play of the matching game employing a set of ten symbols; and (c) the low volatility, the gaming system provides the play of the matching game employing a set of four symbols.

In certain embodiments, rather than enabling the player to determine the volatility and the average expected payback percentage for a play of the matching game via selection of the set of symbols to employ for the play of the matching game, the gaming system enables the player to select one of a plurality of different volatility and average expected payback percentage combinations, and automatically selects a set of symbols to employ for the play of the game such that the play of the game has the selected volatility and average expected payback percentage combination. For instance, in one example embodiment, the gaming system enables the player to select one of the following combinations of volatility and average expected payback percentage for a play of the matching game: (a) a high volatility and a 94% average expected payback percentage, (b) a medium volatility and a 93% average expected payback percentage, and (c) a low volatility and a 92% average expected payback percentage. In this example embodiment, if the gaming system receives a selection from the player of: (a) the high volatility and the 94% average expected payback percentage, the gaming system provides the play of the matching game employing a set, of twenty symbols and having a 94% average expected payback percentage; (b) the medium volatility and the 93% average expected payback percentage, the gaming system provides the play of the matching game employing a set of ten symbols and a 93% average expected payback percentage; and (c) the low volatility and the 92% average expected payback percentage, the gaming system provides the play of the matching game employing a set of four symbols and a 92% average expected payback percentage.

It should be appreciated that:

(a) the particular symbols employed for, the matching game;

(b) the quantity of sets of symbols from which the player may select the player-selected set of symbols;

(c) the quantity of symbols in each of the sets of symbols;

(d) the particular symbols included in each set of symbols;

(e) the number of sets of sets of symbols from which the gaming system enables the player to select symbols;

(f) the designated quantity of the symbols of the player-selected set the gaming system randomly selects and enables the player to select;

(g) how sets of symbols are represented;

(h) the average expected payback percentage of the matching game;

(i) whether and how much the average expected payback percentage of the matching game changes based on the player-selected set of symbols;

(j) how much the award values increase/decrease based on the player-selected set of symbols;

(k) the award values or multipliers;

(l) the designated number of player-selected symbols that much correspond to different randomly-selected symbols for the gaming system to determine an award;

(m) how symbols correspond to one another;

(n) the probabilities of the awards being provides; and/or (o) any other variables and determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM configured to operate the game (described below); (9) determined independent of a random determination at the EGM; (10) determined based on at least one play of at least one game; (11) determined independent of at least one play of at least one game; (12) determined based on a player's selection; (13) determined it dependent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of, a status of the player (i.e., a player tracking status); (24) determined based on one or more other determinations disclosed herein; (25) determined independent any other determination disclosed herein; and/or (26) determined in any other suitable manner or based on or independent of any other suitable factor(s).

Gaming Systems

It should be appreciated that the above-describe embodiments of the present disclosure may be implemented in accordance with or in conjunction with one or more of a variety of different types of gaming systems such as, but not limited to, those described below.

The present disclosure contemplates variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs and "central server, central controller, or remote host" as used herein represents one central server, central controller, or remote host or a plurality of central servers, central controllers, or remote hosts.

Figure 3A:
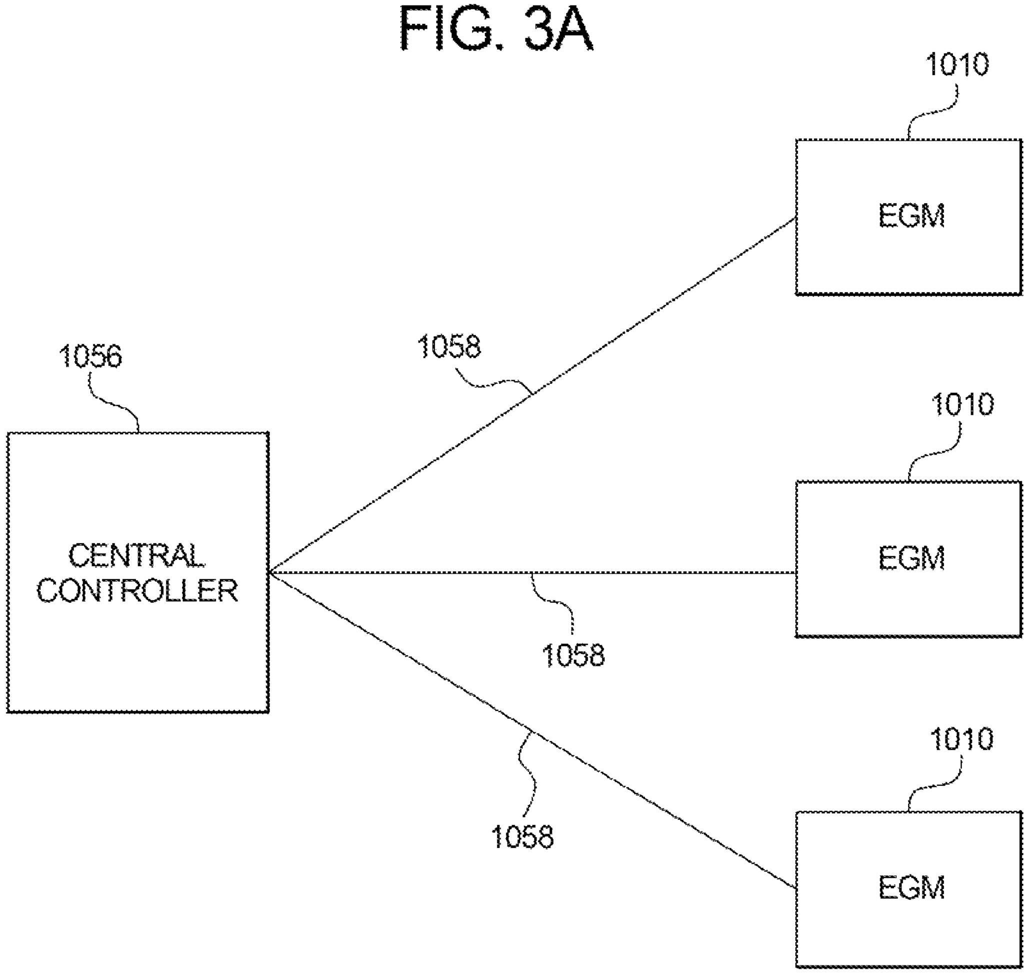
FIG. 3A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In the embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
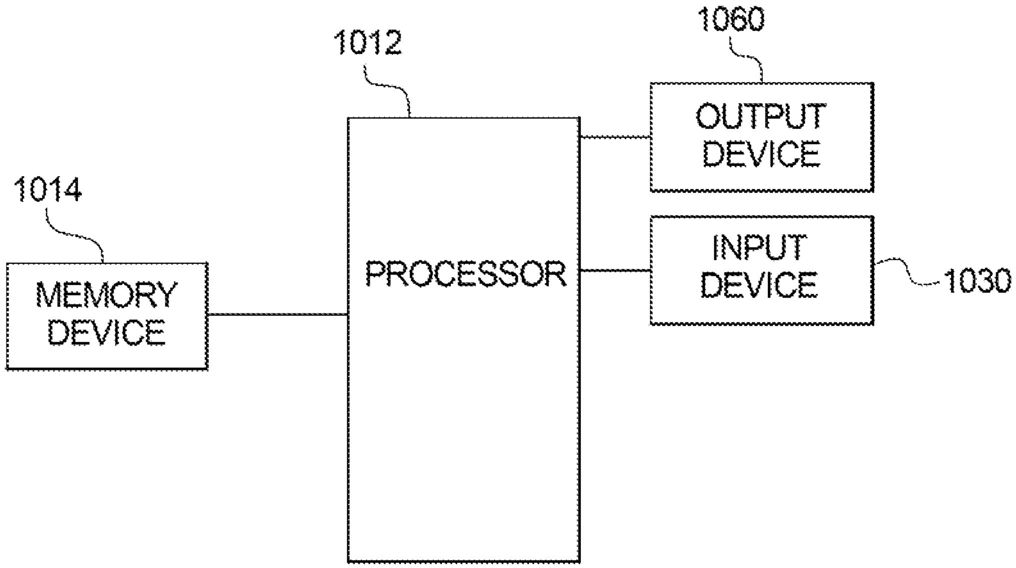
FIG. 3B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
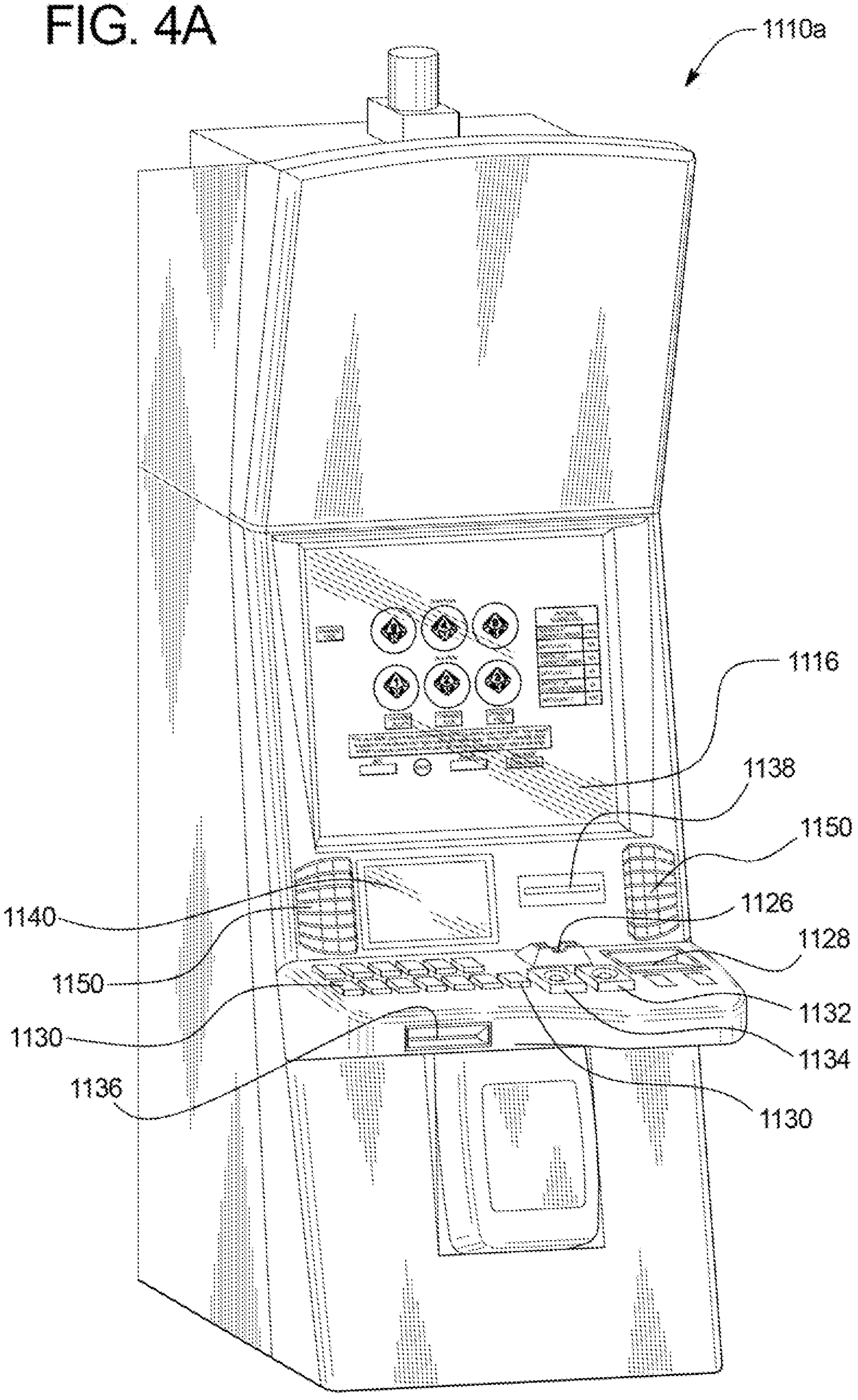
FIGS. 4A and 4B are perspective views of example alternative embodiments of the gaming system of the present disclosure.
Figure 4B:
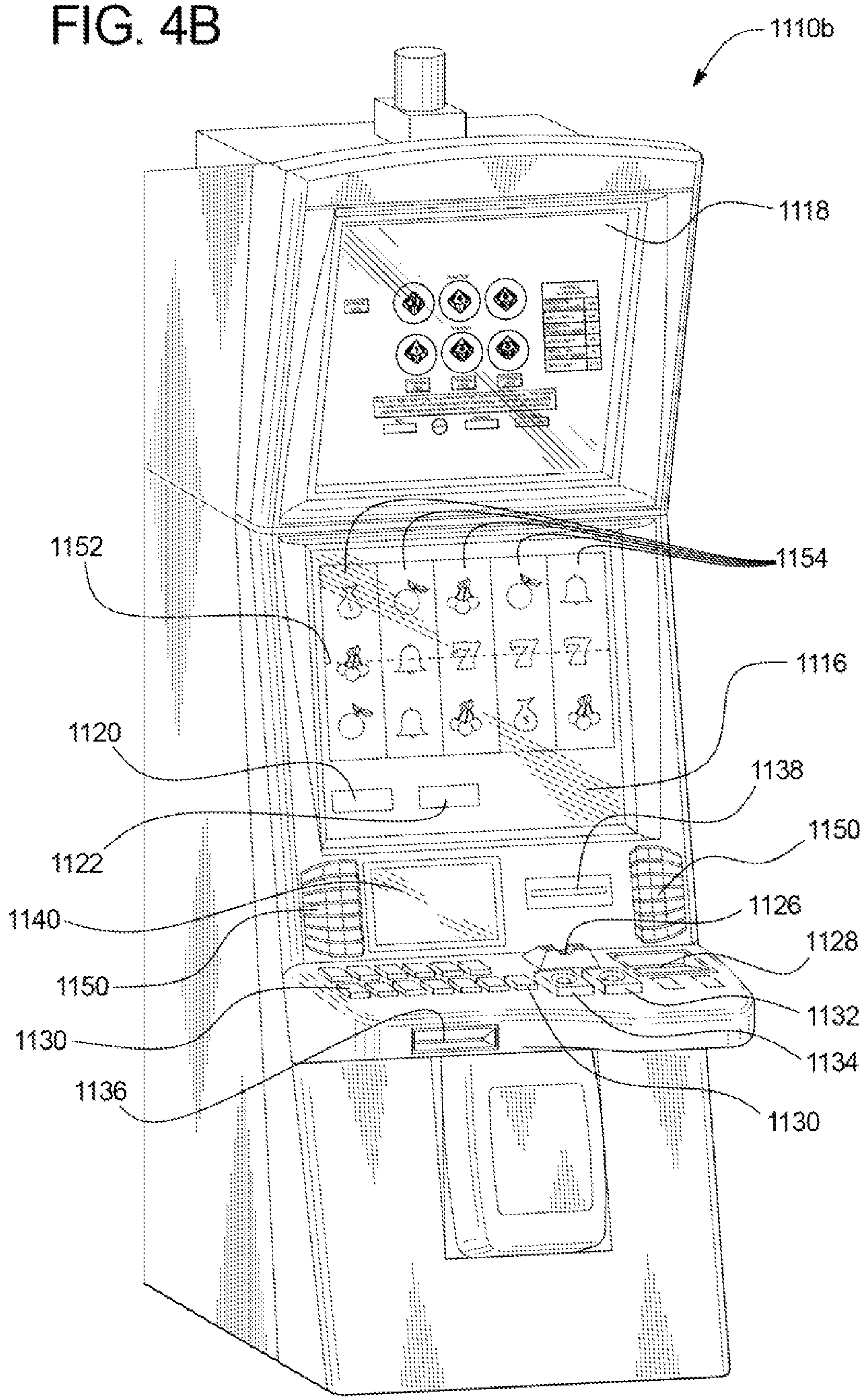

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device has described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable dame programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,663,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels, such as payline 1152 of the EGM of FIG. 4B. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas an a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reds when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,053; 7,780,523; and 7,905,778 and U.S. Patent Application Publication No. 2008/0020846, 2009/0123364, 2009/0123363, and 2010/0227677 describe various examples of different progressive gaming systems.

As generally noted above, in addition to providing winning credits or other awards for one or more pays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game (s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason provided for the providing of the secondary game. In this embodiment, qualifying for a secondary game is not triggered by the occurrence of an event in any primary game or based specifically on any of the plays of any primary game. That is qualification is provided without any explanation or alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased: rather, in the embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGM to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be Made without departing from the spirit and scope of the present subject matter and without diminishing its intended advantages. It is therefore intended that such changes and modifications be covered by the appended claims.

The invention claimed is:

1. A gaming system comprising:

a housing;

a plurality of input devices supported by the housing, the plurality of input devices including an acceptor;

at least one display device supported by the housing;

at least one processor; and at least one memory device that stores a plurality of instructions which, when executed by the at least one processor, cause the at least one processor to operate with the plurality of input devices and the at least one display device to:

(a) if a physical item associated with a monetary value is received by the acceptor, establish a credit balance based at least in part on the monetary value, wherein the physical item is one selected from the group consisting of: a ticket associated with the monetary value, and currency:

(b) if an actuation of a wager button is received, place a wager on a play of a game, the credit balance being decreasable by the wager;

(c) for said play of the game, receive, from a player, a selection of one of a plurality of different sets of symbols, wherein:

(i) each of the sets of symbols includes a quantity of symbols, said quantity of symbols being at least two;

(ii) at least two of the sets of symbols include different quantities of symbols; and (iii) for each of the sets of symbols, at least two of the symbols in said set of symbols are different;

(d) receive, from the player, a selection of a designated quantity of the symbols of the player-selected set of symbols in a target order;

(e) for each of a plurality of symbol display areas, randomly select and display one of the symbols of the player-selected set of symbols at said symbol display area such that said randomly-selected symbols are displayed in a display order;

(f) determine whether at least a designated number of the player-selected symbols of the player-selected set of symbols correspond to the randomly-selected symbols, said designated number being at least one;

(g) if at least the designated number of the player-selected symbols of the player-selected set of symbols correspond to the randomly-selected symbols, determine an award based on: (i) a quantity of the player-selected symbols that correspond to different randomly-selected symbols, and (ii) a comparison of the target order and the display order, the credit balance being increasable by the award, wherein:

(i) if the player-selected set of symbols is a first one of the sets of symbols including a first quantity of symbols, one of the player-selected symbols of the player-selected set of symbols has a first probability of corresponding to one of the randomly-selected symbols; and (ii) if the player-selected set of symbols is a second different one of the sets of symbols including a second different quantity of symbols, said one of the player-selected symbols of the player-selected set of symbols has a second different probability of corresponding to one of the randomly-selected symbols; and (h) if an actuation of a cashout button is received, initiate a payout associated with the credit balance.

2. The gaming system of claim 1, wherein each of the sets of symbols include different quantities of symbols.

3. The gaming system of claim 1, wherein, for each set of symbols, the symbols included in said set of symbols are different.

4. The gaming system of claim 1, wherein the first quantity of symbols is greater than the second quantity of symbols and the second probability is greater than the first probability.

5. The gaming system of claim 4, wherein: (a) if the player-selected set of symbols is the first one of the sets of symbols, the determined award is a first award, and (b) if the player-selected set of symbols is the second one of the sets of symbols; the determined award is a second different award, the first award being greater than the second award.

6. The gaming system of claim 1, wherein a player-selected symbol of the player-selected set of symbols corresponds to a randomly-selected symbol when the player-selected symbol of the player-selected set of symbols matches the randomly-selected symbol.

7. A method of operating a gaming system, said method comprising:

(a) if a physical item associated with a monetary value is received by an acceptor supported by a housing of the gaming system, causing at least one processor to execute a plurality of instructions stored in at least one memory device to establish a credit balance based at least in part on the monetary value, wherein the physical item is one selected from the group consisting of: a ticket associated with the monetary value, and currency;

(b) if an actuation of a wager button is received, causing the at least one processor to execute the plurality of instructions to place a wager on a play of a game, the credit balance being decreasable by the wager;

(c) for said play of the game, receiving, by at least one input device and from a player, a selection of one of a plurality of different sets of symbols, wherein:

(i) each of the sets of symbols includes a quantity of symbols, said quantity of symbols being at least two;

(ii) at least two of the sets of symbols include different quantities of symbols; and (iii) for each of the sets of symbols, at least two of the symbols in said set of symbols are different;

(d) receiving, by the at least one input device and from the player, a selection of a designated quantity of the symbols of the player-selected set of symbols in a target order;

(e) for each of a plurality of symbol display areas, causing the at least one processor to execute the plurality of instructions to randomly select and operate with at least one display device to display one of the symbols of the player-selected set of symbols at said symbol display area such that said randomly-selected symbols are displayed in a display order;

(f) causing the at least one processor to execute the plurality of instructions to determine whether at least a designated number of the player-selected symbols of the player-selected set of symbols correspond to the randomly-selected symbols, said designated number being at least one;

(g) if at least the designated number of the player-selected symbols of the player-selected set of symbols correspond to the randomly-selected symbols, causing the at least one processor to execute the plurality of instructions to determine an award based on: (i) a quantity of the player-selected symbols that correspond to different randomly-selected symbols, and (ii) a comparison of the target order and the display order, the credit balance being increasable by the award, wherein:

(i) if the player-selected set of symbols is a first one of the sets of symbols including a first quantity of symbols, one of the player-selected symbols of the player-selected set of symbols has a first probability of corresponding to one of the randomly-selected symbols; and (ii) if the player-selected set of symbols is a second different one of the sets of symbols including a second different quantity of symbols, said one of the player-selected symbols of the player-selected set of symbols has a second different probability of corresponding to one of the randomly-selected symbols; and (h) if an actuation of a cashout button is received, causing the at least one processor to execute the plurality of instructions to initiate a payout associated with the credit balance.

8. The method of claim 7, wherein each of the sets of symbols include different quantities of symbols.

9. The method of claim 7, wherein, for each set of symbols, the symbols included in said set of symbols are different.

10. The method of claim 7, wherein the first quantity of symbols is greater than the second quantity of symbols and the second probability is greater than the first probability.

11. The method of claim 10, wherein: (a) if the player-selected set of symbols is the first one of the sets of symbols, the determined award is a first award, and (b) if the player-selected set of symbols is the second one of the sets of symbols; the determined award is a second different award, the first award being greater than the second award.

12. The method of claim 7, wherein a player-selected symbol of the player-selected set of symbols corresponds to a randomly-selected symbol when the player-selected symbol matches the randomly-selected symbol.

13. The method of claim 7, which is provided through a data network.

14. The method of claim 13, wherein the data network is an internet.

15. A non-transitory computer readable medium storing a plurality of instructions which, when executed by at least one processor, cause the at least one processor to:

(a) if a physical item associated with a monetary value is received by an acceptor, establish a credit balance based at least in part on the monetary value, wherein the physical item is one selected from the group consisting of: a ticket associated with the monetary value, and currency;

(b) if an actuation of a wager button is received, place a wager on a play of a game, the credit balance being decreasable by the wager;

(c) for said play of the game, operate with at least one input device to receive, from a player, a selection of one of a plurality of different sets of symbols, wherein:

(i) each of the sets of symbols includes a quantity of symbols, said quantity of symbols being at least two;

(ii) at least two of the sets of symbols include different quantities of symbols; and (iii) for each of the sets of symbols, at least two of the symbols in said set of symbols are different;

(d) operate with the at least one input device to receive, from the player, a selection of a designated quantity of the symbols of the player-selected set of symbols in a target order;

(e) for each of a plurality of symbol display areas, randomly select and cause at least one display device to display one of the symbols of the player-selected set of symbols at said symbol display area such that said randomly-selected symbols are displayed in a display order;

(f) determine whether at least a designated number of the player-selected symbols of the player-selected set of symbols correspond to the randomly-selected symbols, said designated number being at least one;

(g) if at least the designated number of the player-selected symbols of the player-selected set of symbols correspond to the randomly-selected symbols, determine an award based on: (i) a quantity of the player-selected symbols that correspond to different randomly-selected symbols, and (ii) a comparison of the target order and the display order, the credit balance being increasable by the award, wherein:

(i) if the player-selected set of symbols is a first one of the sets of symbols including a first quantity of symbols, one of the player-selected symbols of the player-selected set of symbols has a first probability of corresponding to one of the randomly-selected symbols; and (ii) if the player-selected set of symbols is a second different one of the sets of symbols including a second different quantity of symbols, said one of the player-selected symbols of the player-selected set of symbols has a second different probability of corresponding to one of the randomly-selected symbols; and (h) if an actuation of a cashout button is received, initiate a payout associated with the credit balance.

16. The non-transitory computer readable medium of claim 15, wherein each of the sets of symbols include different quantities of symbols.

17. The non-transitory computer readable medium of claim 15, wherein, for each set of symbols, the symbols included in said set of symbols are different.

18. The non-transitory computer readable medium of claim 15, wherein the first quantity of symbols is greater than the second quantity of symbols and the second probability is greater than the first probability.

19. The non-transitory computer readable medium of claim 18, wherein: (a) if the player-selected set of symbols is the first one of the sets of symbols, the determined award is a first award, and (b) if the player-selected set of symbols is the second one of the sets of symbols; the determined award is a second different award, the first award being greater than the second award.

20. The non-transitory computer readable medium of claim 15, wherein a player-selected symbol of the player-selected set of symbols corresponds to a randomly-selected symbol when the player-selected symbol matches the randomly-selected symbol.

* * * * *